(12) United States Patent
Osterwinter et al.

(10) Patent No.: US 10,351,740 B2
(45) Date of Patent: Jul. 16, 2019

(54) REDETACHABLE ADHESIVE STRIP

(71) Applicant: TESA SE, Norderstedt (DE)

(72) Inventors: Gregor Osterwinter, Hamburg (DE);
Beatrice Salert, Hamburg (DE); Thilo Dollase, Hamburg (DE); Michael Egger, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 15/824,727

(22) Filed: Nov. 28, 2017

(65) Prior Publication Data

US 2018/0148618 A1    May 31, 2018

(30) Foreign Application Priority Data

Nov. 30, 2016 (DE) .................. 10 2016 223 852

(51) Int. Cl.
| | | |
|---|---|---|
| *C09J 7/38* | (2018.01) | |
| *C09J 7/24* | (2018.01) | |
| *C09J 153/02* | (2006.01) | |
| *C08K 9/10* | (2006.01) | |
| *C08K 5/01* | (2006.01) | |
| *A47G 1/17* | (2006.01) | |
| *B32B 5/32* | (2006.01) | |

(52) U.S. Cl.
CPC ............ *C09J 153/02* (2013.01); *A47G 1/175* (2013.01); *B32B 5/32* (2013.01); *C08K 5/01* (2013.01); *C09J 7/24* (2018.01); *C09J 7/387* (2018.01); *B32B 2405/00* (2013.01); *C08K 9/10* (2013.01); *C09J 2201/122* (2013.01); *C09J 2201/60* (2013.01); *C09J 2201/606* (2013.01); *C09J 2201/618* (2013.01); *C09J 2201/622* (2013.01); *C09J 2205/102* (2013.01); *C09J 2205/11* (2013.01); *C09J 2400/243* (2013.01); *C09J 2453/00* (2013.01); *C09J 2453/006* (2013.01)

(58) Field of Classification Search
None
See application file for complete search history.

(56) References Cited

U.S. PATENT DOCUMENTS

| | | | |
|---|---|---|---|
| 4,024,312 | A | 5/1977 | Korpman |
| 4,735,837 | A | 4/1988 | Miyasaka et al. |
| 4,885,170 | A | 12/1989 | Hamill et al. |
| 5,402,875 | A | 4/1995 | Markin et al. |
| 5,491,012 | A | 2/1996 | Luehmann et al. |
| 5,507,464 | A | 4/1996 | Hamerski et al. |
| 5,656,932 | A | 5/1997 | Luehmann et al. |

(Continued)

FOREIGN PATENT DOCUMENTS

| | | |
|---|---|---|
| CN | 1693399 A | 11/2005 |
| CN | 102174309 A | 9/2011 |

(Continued)

OTHER PUBLICATIONS

EP Search Report for corresponding application EP 17200004.4A-1102 dated Apr. 11, 2018 (English translation not available).

(Continued)

*Primary Examiner* — Frank D Ducheneaux
(74) *Attorney, Agent, or Firm* — Norris McLaughlin, P.A.

(57) ABSTRACT

The invention relates to an adhesive strip redetachable without residue or destruction by extensive stretching substantially in the bond plane, comprising at least one layer of adhesive which is foamed with microballoons, and at least one carrier B.

24 Claims, 4 Drawing Sheets

(56) References Cited

U.S. PATENT DOCUMENTS

| | | | |
|---|---|---|---|
| 5,672,402 | A | 9/1997 | Kreckel et al. |
| 6,284,378 | B1 | 9/2001 | Junghans et al. |

FOREIGN PATENT DOCUMENTS

| | | |
|---|---|---|
| DE | 3331016 C2 | 10/1984 |
| DE | 3537433 A1 | 10/1986 |
| DE | 4222849 C1 | 6/1993 |
| DE | 4233872 C2 | 3/1994 |
| DE | 4428587 C2 | 2/1996 |
| DE | 4431914 C2 | 3/1996 |
| DE | 19511288 C2 | 10/1996 |
| DE | 19531696 A1 | 3/1997 |
| DE | 19708366 A1 | 1/1998 |
| DE | 19649636 A1 | 6/1998 |
| DE | 19649727 A1 | 6/1998 |
| DE | 19649728 A1 | 6/1998 |
| DE | 19649729 A1 | 6/1998 |
| DE | 19708364 A1 | 9/1998 |
| DE | 19720145 A1 | 11/1998 |
| DE | 19723177 A1 | 12/1998 |
| DE | 19723198 A1 | 12/1998 |
| DE | 19756816 C1 | 2/1999 |
| DE | 19756084 C2 | 7/1999 |
| DE | 19820858 A1 | 11/1999 |
| DE | 19842864 A1 | 3/2000 |
| DE | 19842865 A1 | 3/2000 |
| DE | 19938693 A1 | 2/2001 |
| DE | 10003318 A1 | 8/2001 |
| DE | 10129608 A1 | 5/2003 |
| DE | 10252089 A1 | 5/2004 |
| DE | 10252088 A1 | 6/2004 |
| DE | 102012223670 A1 | 6/2014 |
| DE | 102015206076 A1 | 10/2016 |
| EP | 0257984 A2 | 3/1988 |
| EP | 0816459 A2 | 1/1998 |
| EP | 1102809 B1 | 6/2005 |
| WO | 9211332 A1 | 7/1992 |
| WO | 9211333 A1 | 7/1992 |
| WO | 9421157 A1 | 9/1994 |
| WO | 9422971 A1 | 10/1994 |
| WO | 9506691 A1 | 3/1995 |
| WO | 9531225 A1 | 11/1995 |
| WO | 9707172 A1 | 2/1997 |
| WO | 9803601 A1 | 1/1998 |
| WO | 9818878 A1 | 5/1998 |
| WO | 9931193 A1 | 6/1999 |
| WO | 9937729 A1 | 7/1999 |
| WO | 9963018 A1 | 12/1999 |
| WO | 0012644 A1 | 3/2000 |
| WO | 2010141248 A1 | 12/2010 |
| WO | 2016156305 A1 | 10/2016 |

OTHER PUBLICATIONS

Anonymous, "Vector 4211A / Vector 4211N, Styrene-Isoprene-Styrene (SIS) Block Copolymers", Vector Styrenic Block Copolymers, TSRC, Apr. 2014, www.tsrcdexco.com.
Anonymous, "Vector 8508, Styrene-Butadiene-Styrene (SBS)", Vector Styrenic Block Copolymers, TSRC, Apr. 2014, www.tsrcdexco.com.
KW Office Action in corresponding application KR 2017-0163705 dated Nov. 29, 2018.
TW Office Action in corresponding application TW 106141523 dated Aug. 30, 2018.
TW Search Report in corresponding application TW 106141523 dated Aug. 30, 2018.
Manufacture details: Kraton Performance Polymers, Inc. "Kraton Polymers—Product Guide", 2016.
Manufacture details: Taiwan Synthetic Rubber Corp., Technical Datasheet Vector 4111A/Vector 4111N, 2014.
Translation of Office Action dated Mar. 27, 2019, in connection with Chinese Patent Application No. 201711243915.5.

REDETACHABLE ADHESIVE STRIP

This application claims foreign priority benefit of German Patent Application No. DE 10 2016 223 852.3, filed Nov. 30, 2016, the disclosure of which patent application is incorporated herein by reference.

The invention relates to tear-resistant self-adhesive strips based on vinyl block copolymers which can be used for providing a shock-resistant bond that can be parted again by extensive stretching.

Self-adhesive tapes which have high elastic or plastic extensibility and which can be redetached without residue or destruction by extensive stretching in the bond plane are known from, for example, U.S. Pat. No. 4,024,312 A, DE 33 31 016 C2, WO 92/11332 A1, WO 92/11333 A1, DE 42 22 849 C1, WO 95/06691 A1, DE 195 31 696 A1, DE 196 26 870 A1, DE 196 49 727 A1, DE 196 49 728 A1, DE 196 49 729 A1, DE 197 08 364 A1, DE 197 20 145 A1, DE 198 20 858 A1, WO 99/37729 A1 and DE 100 03 318 A1 and are in some instances referred to below as strippable self-adhesive tapes.

These strippable self-adhesive tapes are frequently used in the form of adhesive film strips which are adhesive on one or both sides and which preferably have a non-adhesive grip region from which the detachment operation is initiated. Particular applications of such self-adhesive tapes are found in publications including DE 42 33 872 C1, DE 195 11 288 C1, U.S. Pat. No. 5,507,464 B1, U.S. Pat. No. 5,672,402 B1 and WO 94/21157 A1. Specific embodiments are also described in DE 44 28 587 C1, DE 44 31 914 C1, WO 97/07172 A1, DE 196 27 400 A1, WO 98/03601 A1 and DE 196 49 636 A1, DE 197 20 526 A1, DE 197 23 177 A1, DE 197 23 198 A1, DE 197 26 375 A1, DE 197 56 084 C1, DE 197 56 816 A1, DE 198 42 864 A1, DE 198 42 865 A1, WO 99/31193 A1, WO 99/37729 A1, WO 99/63018 A1, WO 00/12644 A1 and DE 199 38 693 A1.

Preferred fields of use of aforementioned strippable adhesive film strips include in particular the residuelessly and non-destructively redetachable fixing of lightweight and medium-weight articles in the residential, workplace and office segments. For use in the residential and office segments, the products employed are generally of considerable thickness, at more than 400 µm. In these applications, detachment is typically performed by stretching, substantially in the direction of the bond area.

In the consumer electronics industry—as for example in the production of mobile telephones, digital cameras or laptops—there is an ever-growing desire for a possibility of separating the individual components on disposal after being used. Some components can then be reused or recycled. Or at least separate disposal is possible. There is therefore great interest within this industry too in redetachable adhesive bonds. In particular, adhesive tapes which possess high holding performance and can easily be removed when desired form a reasonable alternative here to adhesive strips which must first be pretreated, by heating, for example, in order to be detached.

Within the consumer electronics segment, the preference is for adhesive strips which are extremely thin, since the end devices are extremely thin and hence all of the individual components are to take up little space as well. In compact constructions, detachment by stretching in the bond direction is often not possible, and stretching must be carried out at relatively large angles (for example more than 45° or more than 90° even).

When very thin strippable adhesive strips are employed which operate without carriers, there is increased incidence of tears (see DE 33 31 016 C2). If the adhesive strips tear, then detachment is generally no longer possible, however, since the remnant of the adhesive strip springs back into the joint and there is therefore no grip tab available. The minimal thickness of the adhesive products in question, and the requirement for detachment at relatively large angles, impose a particular challenge on the design of self-adhesive strips which are suitable for these applications.

WO 92/11332 A1 describes an adhesive film strip which is redetachable by pulling in the bond plane and for which the carrier used may be a highly stretchable, substantially non-resilient film. Adhesives employed are exclusively UV-crosslinked acrylate copolymers, which may be foamed, but with which on non-polar substrates in particular it is not possible to achieve the high bond strengths and which suffer less of a sharp loss in peel adhesion during stretching than is the case, for example, for adhesives based on vinylaromatic block copolymers. Detachment angles of 35° at most or more preferably 30° at most are therefore recommended. As a carrier thickness, a range between 10 µm and 250 µm is specified. The carriers may be polyolefin-based, vinyl polymer-based, or based on olefin copolymer, EVA, ABS, polyurethane, polyacrylate or ABA block copolymers. Resin-modified carriers based on polyvinylaromatic-polydiene block copolymers are not mentioned.

Further publications such as WO 2010/141248 A1 describe systems with pressure-sensitive polyisobutylene adhesives, which likewise exhibit low peel adhesion.

A strippable adhesive film strip having a foamed, non-adhesive film carrier is described in WO 95/06691 A1 (foamed carrier thickness at least 760 µm), DE 196 49 727 A1 (thickness at least 175 µm), DE 196 49 728 A1 (thickness at least 150 µm; in this case, the foam carrier is pre-damaged, and the resistance to tears results from the layer of adhesive, meaning that foaming in this case would be counter-productive), and DE 196 49 729 A1 (thickness of at least 175 µm). Given the intermediate foam carrier, a low thickness for the adhesive film strip, of below 200 µm, is hardly possible.

There are also multi-layer adhesive strips known which are detachable by stretching and comprise an extensible carrier, which are based on block copolymers.

U.S. Pat. No. 4,024,312 A discloses strippable self-adhesive strips comprising at least one adhesive layer based on tackifying-resin-modified styrene block copolymer, and an extensible carrier based on styrene block copolymer, which may likewise have undergone modification with tackifying resin. Foamed layers of pressure-sensitive adhesive are not mentioned.

DE 197 08 366 A1 describes multi-strippable self-adhesive strips whose adhesive outer layers consist of a resin-containing styrene block copolymer formulation, with the extensible carrier layer likewise consisting of a resin-containing styrene block copolymer formulation. In this way the intention is to prevent any resin migration between the various layers. The thickness of the individual layers may be between 5 µm and 3000 µm; the thickness with the middle layer in three-layer laminates is between 75 µm and 2000 µm, and that for outer layers is between 15 µm and 500 µm. Outer layers may comprise hollow glass beads or other fillers. Foamed outer layers are not mentioned. Very different types of resin are said to be able to be used, not only aliphatic, cycloaliphatic and aromatically modified aliphatic tackifying resins, but also rosin and derivatives thereof, and aromatic and phenol-modified tackifying resins. Specific formulation examples cite primarily combinations with rosins or those with mineral oils as plasticizers. However, rosin derivatives and tackifying resins with pronounced aromatic nature are expected to be compatible with polyvinylaromatics as well and to be able in that case to result in a weakening of the cohesion. Such resins are therefore not advantageous in the sense of the present invention, particularly in the case of very thin strippable self-adhesive strips. Similarly, low-viscosity plasticizers such as mineral oils are disadvantageous on account of their high tendency to migrate onto/into bond substrates as well.

In accordance with the teaching of DE 198 20 858 A1, a strippable self-adhesive strip may comprise an unfoamed carrier. These carriers, however, are pre-damaged, and the resistance to tears in this case results from the layers of pressure-sensitive adhesive. Here, therefore, foaming is counter-productive. Resin modifications of the carrier layer are not cited.

DE 101 29 608 A1 discloses strippable self-adhesive strips which comprise a pressure-sensitive adhesive based on acrylate block copolymers. These self-adhesive strips may have a multi-layer configuration, in which case the carrier layer may consist of a resin-modified styrene block copolymer. Adhesive layers based on acrylate block copolymer typically do not have the very high peel adhesions which are achievable with resin-modified polystyrene-polydiene block copolymers. Foamed layers are not envisaged in this context, since in that case the transparency required by DE 101 29 608 is not achieved.

DE 102 52 088 A1 teaches transparent, multi-layer, strippable self-adhesive strips which in the outer layers have pressure-sensitive adhesives based on hydrogenated block copolymers. Explicitly stated in description and examples are SEBS and SEPS. Pressure-sensitive adhesives based on such hydrogenated block copolymers typically do not have the very high peel adhesions which can be achieved with resin-modified polystyrene-polydiene block copolymers. Foaming is not envisaged, on account of the required transparency.

DE 102 52 089 A1 describes strippable self-adhesive strips comprising at least one layer of pressure-sensitive adhesive, based on polyvinylaromatic-polydiene block copolymers, in which there are selectively hydrogenated vinyl groups in the polydiene blocks. These layers of pressure-sensitive adhesive may also be utilized as outer layers in multi-layer products, in which styrene block copolymer-based formulations are utilized as carrier material. Foamed outer layers are not envisaged.

DE 10 2012 223 670 A1 discloses strippable self-adhesive strips having an extensible carrier based on a polyurethane. Foamed layers of pressure-sensitive adhesive are not envisaged.

DE 10 2015 206 076 A1 teaches strippable self-adhesive strips which comprise at least one layer of a foam pressure-sensitive adhesive. The self-adhesive strips may comprise an extensible carrier material. Stated explicitly for this purpose are polymer films, based for example on olefin (co)polymers, polyurethanes, natural rubbers and randomly copolymerized synthetic rubbers, polyacrylate rubbers, EVA, and also various block copolymers. Polyurethanes are preferred. There is no provision for modifying carrier materials with tackifying resins.

Foamed pressure-sensitive adhesive systems have been known for some considerable time and described in the prior art. In principle, polymer foams can be produced in two ways. One way is via the effect of a blowing gas, whether added as such or resulting from a chemical reaction, and a second way is via incorporation of hollow beads into the material matrix. Foams that have been produced by the latter route are referred to as syntactic foams.

Compositions foamed using hollow microbeads are notable for a defined cell structure with a uniform size distribution of the foam cells. With hollow microbeads, closed-cell foams without cavities are obtained, which are distinguished from their open-cell counterparts by qualities including an improved sealing activity with respect to dust and liquid media. Furthermore, materials foamed chemically or physically are more susceptible to a reversible collapse under pressure and temperature, and frequently exhibit a lower cohesive strength.

Particularly advantageous properties can be achieved when the microbeads used for foaming are expandable microbeads (also referred to as "microballoons"). By virtue of their flexible, thermoplastic polymer shell, foams of this kind have greater adaptation capacity than those filled with non-expandable, non-polymeric hollow microbeads (for example hollow glass beads). They have better suitability for compensation for manufacturing tolerances, as is the rule, for example, with injection-moulded parts, and are also able more effectively to compensate for thermal stresses, because of their foam character. In the case of hollow glass beads, furthermore, a common difficulty is that of destruction during incorporation.

Furthermore, the mechanical properties of the foam can be influenced further through the selection of the thermoplastic resin of the polymer shell. Hence it is possible, for example, to produce foams having greater cohesive strength than with the polymer matrix alone, even when the foam has a lower density than the matrix. For instance, typical foam properties such as the capacity for adaptation to rough substrates can be combined with a high cohesive strength for self-adhesive foams.

EP 0 257 984 A1 discloses adhesive tapes which at least on one side have a foamed adhesive coating. Contained within this adhesive coating are polymer beads which in turn comprise a hydrocarbon liquid and which expand at elevated temperatures. The scaffold polymers of the pressure-sensitive adhesive compositions may consist of rubbers or polyacrylates. The microballoons here are added either before or after the polymerization. The microballoon-containing pressure-sensitive adhesive compositions are processed from solvent and shaped to form adhesive tapes. The step of foaming takes place here logically after the coating operation. In this way, micro-rough surfaces are obtained. This results in properties such as, in particular, repositionability. The effect of the better repositionability by means of micro-rough surfaces of pressure-sensitive adhesive compositions foamed using microballoons is also described in other specifications such as DE 35 37 433 A1 or WO 95/31225 A1.

The micro-rough surface is used in order to produce bubble-free bonding. The same use is also disclosed by EP 0 693 097 A1 and WO 98/18878 A1. Pressure-sensitive adhesive compositions foamed using microballoons are also known from specifications U.S. Pat. No. 4,885,170 A and EP 1 102 809 B, where they are employed, however, as a filler for adhesive tapes for permanent bonding which are not redetachable. Known from the prior art (DE 10 2015 206 076 A1) are further self-adhesive compositions that are foamed and can be stretch-released from an adhesive bond.

Among the devices in the consumer electronics industry are electronic, optical and precision devices, in the context of this application especially those devices as classified in Class 9 of the International Classification of Goods and Services for the Registration of Marks (Nice Classification); 10th edition (NCL(10-2013)), to the extent that these are electronic, optical or precision devices, and also clocks and chronometers according to Class 14 (NCL(10-2013)),
such as, in particular,
scientific, marine, measurement, photographic, film, optical, weighing, measuring, signaling, monitoring, rescuing, and instruction apparatus and instruments;
apparatus and instruments for conducting, switching, converting, storing, regulating and monitoring electricity;
image recording, processing, transmission, and reproduction devices, such as televisions and the like;
acoustic recording, processing, transmission, and reproduction devices, such as broadcasting devices and the like;
computers, calculating instruments and data-processing devices, mathematical devices and instruments, computer accessories, office instruments—for example, printers, faxes, copiers, typewriters—, data-storage devices;
telecommunications devices and multifunction devices with a telecommunications function, such as telephones and answering machines;
chemical and physical measuring devices, control devices, and instruments, such as battery chargers, multimeters, lamps, and tachometers;
nautical devices and instruments;
optical devices and instruments;
medical devices and instruments and those for sportspeople;
clocks and chronometers;
solar cell modules, such as electrochemical dye solar cells, organic solar cells, and thin-film cells;
fire-extinguishing equipment.

Technical development is going increasingly in the direction of devices which are ever smaller and lighter in design, allowing them to be carried at all times by their owner, and usually being generally carried. This is usually accomplished by realization of low weights and/or suitable size of such devices. Such devices are also referred to as mobile devices or portable devices for the purposes of this specification. In this development trend, precision and optical devices are increasingly being provided (also) with electronic components, thereby raising the possibilities for minimization. On account of the carrying of the mobile devices, they are subject to increased loads—in particular, to mechanical loads—as for instance by impact on edges, by being dropped, by contact with other hard objects in a bag, or else simply by the permanent motion involved in being carried per se. Mobile devices, however, are also subject to a greater extent to loads due to moisture exposure, temperature influences, and the like, than those "immobile" devices which are usually installed in interiors and which move little or not at all.

The invention accordingly refers with particular preference to mobile devices, since the self-adhesive products according to the invention have a particular benefit here on account of their unexpectedly good properties (very high shock resistance). Listed below are a number of portable devices, without wishing the representatives specifically identified in this list to impose any unnecessary restriction with regard to the subject-matter of the invention.

Cameras, digital cameras, photography accessories (such as light meters, flashguns, diaphragms, camera casings, lenses, etc.), film cameras, video cameras,
small computers (mobile computers, handheld computers, handheld calculators), laptops, notebooks, netbooks, ultrabooks, tablet computers, handhelds, electronic diaries and organizers (called "electronic organizers" or "personal digital assistants", PDAs, palmtops), modems,
computer accessories and operating units for electronic devices, such as mice, drawing pads, graphics tablets, microphones, loudspeakers, games consoles, gamepads, remote controls, remote operating devices, touch pads,
monitors, displays, screens, touch-sensitive screens (sensor screens, touchscreen devices), projectors,
reading devices for electronic books ("E-books"),
mini TVs, pocket TVs, devices for playing films, video players,
radios (including mini and pocket radios), Walkmans, Discmans, music players for e.g. CDs, DVDs, Blu-ray, cassettes, USB, MP3, headphones,
cordless telephones, mobile phones, smartphones, two-way radios, hands-free telephones, devices for summoning people (pagers, bleepers),
mobile defibrillators, blood sugar meters, blood pressure monitors, step counters, pulse meters,
torches, laser pointers,
mobile detectors, optical magnifiers, long-range vision devices, night vision devices,
GPS devices, navigation devices, portable interface devices for satellite communications,
data storage devices (USB sticks, external hard drives, memory cards),
wristwatches, digital watches, pocket watches, chain watches, stopwatches.

For these devices, a particular requirement is for self-adhesive tapes having high holding performance that are removable easily as and when desired. In addition, it is important that the holding performance of the adhesive tapes does not fail when the electronic device, for example a mobile phone, is dropped and hits the ground. The self-adhesive strip must thus have very high shock resistance.

It is an object of the invention, accordingly, to find an adhesive strip which is detachable very largely without residue or destruction by stretching in the direction of the bond plane, but also, in particular, in unfavourable detachment configuration, said strip combining particularly high shock resistance with good bonding strength. The adhesive strip is to be extremely thin (leaving aside temporary release films or release liners), in order to take account of the trend for mobile devices of increasingly small and lightweight size.

The object is achieved in accordance with the invention with a generic adhesive strip, also referred to below as self-adhesive strip, as specified herein. Advantageous developments of the adhesive strip are further described herein.

The invention relates accordingly to an adhesive strip which can be detached by extensive stretching, comprising one or more layers of pressure-sensitive adhesive all of which consist of a pressure-sensitive adhesive which is foamed in particular with microballoons, and of one or more extensible carrier layers.

The self-adhesive strip consists in particular exclusively of the stated layers of pressure-sensitive adhesive and carrier layers, with one outer, upper face and one outer, lower face of the self-adhesive strip being formed by the stated layer or layers of pressure-sensitive adhesive.

This means that the self-adhesive strip has an upper, outer face and a lower, outer face, with neither the upper, outer face nor the lower, outer face bearing one or more further layers, and in particular no other layers of pressure-sensitive adhesive, which are part of the self-adhesive strip. The self-adhesive strip may be lined on one or both sides, prior to use, with a liner (release paper or release film).

It is essential to the invention that the outer faces of the self-adhesive strip, accessible for adhesive bonding, are formed by the foamed pressure-sensitive adhesive of the invention. The foamed character produces the advantages determined in accordance with the invention, such as the high shock resistance.

Adhesive tapes coated with adhesives on one or both sides are usually wound up at the end of the production process to form a roll in the form of an Archimedean spiral. In order, in the case of double-sided adhesive tapes, to prevent the pressure-sensitive adhesives coming into contact with one another, or to prevent bonding of the pressure-sensitive adhesive to the carrier in the case of single-sided adhesive tapes, the adhesive tapes prior to winding are applied to a liner material (also referred to as release material) which is wound up together with the adhesive tape. The skilled person knows of such lining materials under the name release liner or simply liner. In addition to the lining of single-sided or double-sided adhesive tapes, liners are also employed for enveloping labels.

A liner (release paper, release film) is not part of an adhesive tape or label, but is merely an accessory to the production thereof or storage or for further processing by die-cutting. In contrast to an adhesive tape carrier, furthermore, a liner is not firmly joined to a layer of adhesive.

The foamed pressure-sensitive adhesive (PSA) A, forming at least one layer of adhesive, of the adhesive strip comprises an elastomer part (a1) based on at least one kind of a polyvinylaromatic-polydiene block copolymer, and a tackifying resin part (a2) with at least one kind of tackifying resin, and also, optionally, a plasticizing resin part (a3) and optionally further additives (a4). The embodiments set out in the description hereinafter produce the required bonding properties on various substrates.

Also present in the self-adhesive strip is at least one carrier B. The at least one carrier B comprises an elastomer part (b1) based on at least one kind of a polyvinylaromatic-polydiene block copolymer, and a tackifying resin part (b2) with at least one kind of a tackifying resin, and also, optionally, a plasticizing resin part (b3) and optionally further additives (b4).

According to one preferred embodiment of the invention, the carrier is arranged preferably centrally in the layer of adhesive formed from the PSA A.

In an alternative, three-layer variant, PSA layers formed from the PSA A are disposed above and below the carrier B, and with further preference the two PSA layers are identical.

Self-adhesive strips of the invention which are redetachable substantially without residue or destruction by extensive stretching may consist of one or more layers of adhesive, all of which consist of a PSA A and are foamed with microballoons, and of one or more carrier layers B, in which case the outer, upper face and the outer, lower face of the self-adhesive strip are formed by the layer or layers of adhesive consisting of the PSA A.

The at least one layer A of adhesive consists of an elastomer part (a1), a tackifying resin part (a2), optionally a plasticizing resin part (a3) and optionally further additives (a4), where the elastomer part (a1) consists to an extent of at least 90 wt % of polyvinylaromatic-polydiene block copolymers, more particularly polyvinylaromatic-polybutadiene block copolymers, the polyvinylaromatic content of the polyvinylaromatic-polydiene block copolymers is at least 12 wt % and at most 35 wt %, preferably at least 20 wt % and at most 32 wt %, and the fraction of the elastomer part (a1), based on the overall adhesive A, is at least 40 wt % and at most 55 wt %, preferably at least 45 wt %, the tackifying resin part (a2) consists to an extent of at least 90 wt %, preferably at least 95 wt %, of hydrocarbon resins which are substantially compatible with the polydiene blocks and substantially incompatible with the polyvinylaromatic blocks, and the fraction of the tackifying resin part (a2), based on the overall adhesive A, is at least 40 wt % and at most 60 wt %, the plasticizing resin part (a3), based on the overall adhesive, is 0 wt % up to at most 5 wt %, the fraction of microballoons, based on the overall adhesive, is at least 0.5 wt % and at most 2.5 wt %, preferably at least 1.0 wt % and at most 2.0 wt %, and the thickness of the at least one foamed PSA layer A is at least 20 µm and at most 75 µm, preferably at least 25 µm and at most 65 µm.

If the sum total of the weight fractions of elastomer part (a1), of tackifying resin part (a2), of plasticizing resin part (a3) and of microballoons does not make 100 wt %, the remainder to 100 wt % is formed by the additives (a4).

The at least one carrier layer B consists of an elastomer part (b1), a tackifying resin part (b2), optionally a plasticizing resin part (b3) and optionally further additives (b4), where the elastomer part (b1) consists to an extent of at least 90 wt % of polyvinylaromatic-polydiene block copolymers, more particularly polyvinylaromatic-polybutadiene block copolymers and/or polyvinylaromatic-polyisoprene block copolymers, the polyvinylaromatic content of the polyvinylaromatic-polydiene block copolymers is at least 20 wt % and at most 45 wt %, preferably at least 25 wt % and at most 35 wt %, the fraction, within the elastomer part, of at least one triblock copolymer or multiblock copolymer (linear or radial) is at least 80 wt %, preferably at least 90 wt %, and the molar mass of the triblock copolymer or multiblock copolymer (linear or radial) (peak molar mass by GPC) is at least 85 000 g/mol, the fraction of diblock copolymers is less than 20 wt %, more particularly at most 18 wt %, preferably at most 10 wt %, very preferably 0 wt %, and the fraction of elastomers (b1), based on the formulation of the carrier layer B, is at least 40 wt % and at most 60 wt %, preferably at least 45 wt % and at most 55 wt %, the tackifying resin part (b2) consists to an extent of at least 90 wt %, preferably at least 95 wt %, of hydrocarbon resins which are substantially compatible with the polydiene blocks and substantially incompatible with the polyvinylaromatic blocks, and the fraction of the tackifying resin part (b2), based on the overall formulation of the carrier layer B, is at least 40 wt % and at most 60 wt %, the plasticizing resin fraction (b3), based on the overall formulation of the carrier layer, is 0 wt % to at most 5 wt %, the thickness of the carrier layer B is at least 70 µm and at most 150 µm, preferably at least 80 µm and at most 120 µm, and the carrier layer B is substantially unfoamed.

If the sum total of the weight fractions of elastomer part (b1), of tackifying resin part (b2) and of plasticizing resin part (b3) does not make 100 wt %, the remainder to 100 wt % is formed by the additives (b4).

Self-adhesive strips of the invention preferably have an overall thickness (excluding temporary release liners or release films) of at most 250 µm, preferably of less than 175 µm. Single-sidedly self-adhesive strips (one layer of adhesive, one carrier layer) are at least 90 µm, typically at least 100 µm, thick.

In the case of the three-layer variant (two layers of adhesive, one carrier layer), the minimum thickness is 110 µm.

Thicker constructions with thicker and/or further layers are possible.

The maximum extensibility of the carrier layer B is very preferably at least as high as the maximum extensibility of the foamed layer(s) of adhesive.

In terms of type, the tackifying resin combination (a2) and the tackifying resin combination (b2) for the PSA layer A and the carrier layer B are preferably selected identically. Similarly, where this component is employed, the plasticizing resin combination (a3) and plasticizing resin combination (b3) are selected identically in terms of type for the PSA layer A and the carrier layer B, according to one preferred embodiment. Again, where this component is employed, an additive (a4) and an additive (b4) are selected identically in terms of type for the PSA layer A and the carrier layer B, according to one preferred embodiment. In this way, any migration potential on the part of constituents (a2), (b2), (a3), (b3), (a4) and/or (b4) is minimized or even suppressed entirely.

"Type" here refers to the underlying chemistry and/or construction for the constituent in question (for example, tackifying resin). Constituents of the same type have the same chemistry and/or structure (for example linear or branched) and/or the same molar mass and/or molar mass distribution. Relevant constituents are preferably identical with regard to two criteria, very preferably with regard to three criteria, and with particular preference with regard to all four.

The fact that self-adhesive strips with the construction outlined achieve the stated requirements very well is surprising. It is surprising in particular with regard to the good detachment behaviour by extensive stretching even under difficult detachment conditions. Utilizing a tackifying resin in the carrier material, indeed, lowers the tensile strength of the carrier. The tensile strength of the carrier, however, may be assumed to be critical for successful detachment behaviour with extensive stretching ("tear-free detachment"). It is possible to expect that the tensile strength of the carrier is all the more important for detachment when the PSA layer(s) are foamed and themselves contribute not very effectively to the tensile strength of the self-adhesive strip.

For relevantly known strippable self-adhesive strips to be able to be redetached easily and without residue, they are required to possess certain technical adhesive properties:

On stretching, the tack of the adhesive film strips must fall significantly. The lower the bonding power in the stretched state, the less the extent to which the substrate is damaged during detachment, or the less pronounced the risk of residues remaining on the bond substrate.

This property is particularly apparent in the case of adhesives based on vinylaromatic block copolymers, for which the tack drops to below 10% in the vicinity of the yield point.

So that strippable self-adhesive tapes can be redetached easily and without residue, they are required to have certain mechanical properties as well, in addition to the technical adhesive properties described above.

With particular advantage that ratio of the tearing force to the stripping force is greater than two, preferably greater than three. The stripping force here is the force expended in order to part an adhesive strip from a bond line again by parallel pulling in the direction of the bond plane. This stripping force is made up of the force which is needed, as described above, for detaching the adhesive tape from the bond substrates, and the force which must be expended in order to deform the adhesive tape. The force required for the deformation of the adhesive tape is dependent on the thickness of the adhesive film strip.

Within the thickness range under consideration for the adhesive film strip, in contrast, the force required for the detachment is independent of the thickness of the adhesive strips.

1.) Foamed Pressure-Sensitive Adhesive A

The PSA layer A comprises a pressure-sensitive adhesive which is constructed on the basis of at least one polyvinylaromatic-polydiene block copolymer (a1) and at least one tackifying resin (a2).

The elastomer part (a1) comprises at least one polyvinylaromatic-polydiene block copolymer in the form of a block copolymer having an A-B, A-B-A, $(A-B)_n$, $(A-B)_nX$ or $(A-B-A)_nX$ structure,
in which
the A blocks are independently a polymer formed by polymerization of at least one vinylaromatic;
the B blocks are independently a polymer formed by polymerization of conjugated dienes having 4 to 18 carbon atoms, or in the polydiene block a partly hydrogenated derivative of such a polymer;
X is the radical of a coupling reagent or initiator; and
n is an integer 2.

More particularly, all synthetic rubbers in the pressure-sensitive adhesive of the invention are block copolymers having a construction as set out above. The pressure-sensitive adhesive of the invention may thus also comprise mixtures of various block copolymers having a construction as above.

Suitable block copolymers (vinylaromatic block copolymers) thus comprise one or more rubber-like blocks B (soft blocks) and one or more glass-like blocks A (hard blocks). More preferably, at least one synthetic rubber in the pressure-sensitive adhesive of the invention is a block copolymer having an A-B, A-B-A, $(A-B)_2X$, $(A-B)_3X$ or $(A-B)_4X$ construction, where the above meanings are applicable to A, B and X. Most preferably, all synthetic rubbers in the pressure-sensitive adhesive of the invention are block copolymers having an A-B, A-B-A, $(A-B)_2X$, $(A-B)_3X$ or $(A-B)_4X$ construction, where the above meanings are applicable to A, B and X. More particularly, the synthetic rubber in the pressure-sensitive adhesive of the invention is a mixture of block copolymers having an A-B, A-B-A, $(A-B)_2X$, $(A-B)_3X$ or $(A-B)_4X$ structure, preferably comprising at least diblock copolymers A-B and/or triblock copolymers A-B-A or $(A-B)_2X$.

Also advantageous is a mixture of diblock and triblock copolymers and $(A-B)_n$ or $(A-B)_nX$ block copolymers with n not less than 3.

Also advantageous is a mixture of diblock copolymers and radial multiblock copolymers $(A-B)_n$ or $(A-B)_nX$ with n not less than 3.

The pressure-sensitive adhesive compositions employed are preferably those based on block copolymers comprising polymer blocks predominantly formed from vinylaromatics (A blocks), preferably styrene, and those predominantly formed by polymerization of 1,3-dienes (B blocks), for example butadiene and isoprene or a copolymer of these, especially butadiene. The products here may also have partial hydrogenation in the diene block. With regard to partially hydrogenated derivatives, particular suitability is possessed by block copolymers in which in particular any vinyl groups, i.e. repeating units, which are present in unsaturated form in the side chain, such as 1,2-polybutadiene, 1,2-polyisoprene or 3,4-polyisoprene, are in hydrogenated form.

Preferably, the block copolymers of the pressure-sensitive adhesive compositions have polystyrene end blocks.

The block copolymers that result from the A and B blocks may contain identical or different B blocks. The block copolymers may have linear A-B-A structures. It is likewise possible to use block copolymers in radial form and star-shaped and linear multiblock copolymers. Further components present may be A-B diblock copolymers. All the aforementioned polymers can be utilized alone or in a mixture with one another.

Rather than the preferred polystyrene blocks, vinylaromatics used may also be polymer blocks based on other aromatic-containing homo- and copolymers (preferably C8 to C12 aromatics) having glass transition temperatures of greater than 75° C., for example a-methylstyrene-containing aromatic blocks. In addition, it is also possible for identical or different A blocks to be present.

Preferably, the vinylaromatics for formation of the A block include styrene, a-methylstyrene and/or other styrene derivatives. The A block may thus be in the form of a homo- or copolymer. More preferably, the A block is a polystyrene.

Preferred conjugated dienes as monomers for the soft block B are especially selected from the group consisting of butadiene, isoprene, ethylbutadiene, phenylbutadiene, piperylene, pentadiene, hexadiene, ethylhexadiene and dimethylbutadiene, and any desired mixtures of these monomers. The B block may also be in the form of a homopolymer or copolymer.

More preferably, the conjugated dienes as monomers for the soft block B are selected from butadiene and isoprene. For example, the soft block B is a polyisoprene, a polybutadiene or a partly hydrogenated derivative of one of these two polymers, such as polybutylene-butadiene in particular, or a polymer formed from a mixture of butadiene and isoprene. Most preferably, the B block is a polybutadiene.

A blocks are also referred to as "hard blocks" in the context of this invention. B blocks are correspondingly also called "soft blocks" or "elastomer blocks". This is reflected by the inventive selection of the blocks in accordance with their glass transition temperatures (for A blocks at least 25° C., especially at least 50° C., and for B blocks at most 25° C., especially at most −25° C.).

The proportion of the vinylaromatic block copolymers, styrene block copolymers in particular, in one preferred embodiment, in total, based on the overall pressure-sensitive adhesive, is at least 40% by weight, preferably at least 45% by weight.

Too low a proportion of vinylaromatic block copolymers results in relatively low cohesion of the pressure-sensitive adhesive composition, and so it tears more easily on stripping. Moreover, there is an increase in the glass transition temperature of the elastomer phase, thereby reducing the shock resistance. There is a risk, furthermore, of residues remaining on the bond substrate during detachment.

The maximum proportion of the vinylaromatic block copolymers, styrene block copolymers in particular, in total, based on the overall pressure-sensitive adhesive composition, is at most 55% by weight. Too high a proportion of vinylaromatic block copolymers in turn results in no longer sufficient pressure-sensitive adhesion in the pressure-sensitive adhesive composition.

Accordingly, the proportion of the vinylaromatic block copolymers, styrene block copolymers in particular, in total, based on the overall pressure-sensitive adhesive composition, is at least 40% by weight, preferably at least 45% by weight, and simultaneously at most 55% by weight.

Besides the at least one vinylaromatic block copolymer, the PSAs have at least one tackifying resin (a2) in order to increase the adhesion in a desired manner. The tackifying resin ought to be compatible with the elastomer block of the block copolymers.

A "tackifying resin", in accordance with the general understanding of the person skilled in the art, is understood to mean an oligomeric or polymeric resin that increases the adhesion (tack, intrinsic tackiness) of the pressure-sensitive adhesive composition compared to the pressure-sensitive adhesive composition that does not contain any tackifying resin but is otherwise identical.

Accordingly, to an extent of at least 90 wt %, preferably at least 95 wt % (based on the total resin fraction), a resin is selected that has in particular a DACP (diacetone alcohol cloud point) of greater than +5° C., preferably greater than +10° C. and less than +65° C. (if there is a polyisoprene block copolymer in the elastomer part), preferably less than +50° C. (if there is no polyisoprene block copolymer in the elastomer part). The at least one resin, moreover, in particular has a MMAP (mixed methylcyclohexane aniline point) of at least +50° C., preferably of at least +60° C., and of not more than +100° C. (if there is a polyisoprene block copolymer present in the elastomer part), preferably of not more than +90° C. (if there is no polyisoprene block copolymer in the elastomer part). The at least one tackifying resin has a softening temperature (Ring & Ball) of not less than 70° C., preferably not less than 100° C., and up to 150° C.

It has been found that tackifiers advantageously usable for the PSA composition(s) are, in particular, nonpolar hydrocarbon resins, for example hydrogenated and non-hydrogenated polymers of dicyclopentadiene, non-hydrogenated, partly, selectively or fully hydrogenated hydrocarbon resins based on $C_5$, $C_9/C_9$ or $C_9$ monomer streams, and polyterpene resins based on α-pinene and/or ß-pinene and/or δ-limonene. Aforesaid tackifying resins can be used either alone or in a mixture. Tackifying resins, in hydrogenated or non-hydrogenated form, which also contain oxygen may optionally be used preferably up to a maximum proportion of 10%, based on the total amount of the resins, in the adhesive composition.

With particular preference at least 75 wt % (based on the total resin fraction) of the tackifying resins are hydrocarbon resins or terpene resins or a mixture of the same.

The PSA of the invention comprises preferably 40 to 60 wt % of at least one tackifying resin, based on the overall weight of the PSA.

The fraction of the plasticizing resins (a3) which have (sparing) fluidity at room temperature is up to 5 wt %, based on the overall PSA. It is also possible, however, to do without plasticizing resins which have (sparing) fluidity at room temperature. Advantageously, low-viscosity plasticizers such as mineral oils and vegetable oils, for example, are shunned entirely. Where plasticizing resins are employed, preference is given to those of sparing fluidity, having a melt viscosity at 25° C. and 1 Hz of at least 25 Pa*s, more particularly of at least 50 Pa*s, and a softening temperature of <25° C. The melt viscosity is determined according to Test VI.

Further additives (a4) that can typically be utilized are:
- primary antioxidants, for example sterically hindered phenols, preferably with a proportion of 0.2% to 1% by weight, based on the total weight of the PSA,
- secondary antioxidants, for example phosphites, thioesters or thioethers, preferably with a proportion of 0.2% to 1% by weight, based on the total weight of the PSA,
- process stabilizers, for example carbon radical scavengers, preferably with a proportion of 0.2% to 1% by weight, based on the total weight of the PSA,
- light stabilizers, for example UV absorbers or sterically hindered amines, preferably with a proportion of 0.2% to 1% by weight, based on the total weight of the PSA,
- processing auxiliaries, preferably with a proportion of 0.2% to 1% by weight, based on the total weight of the PSA,
- end block reinforcer resins, preferably with a proportion of 0.2% to 10% by weight, based on the total weight of the PSA, and
- optionally further polymers that are preferably elastomeric in nature;
- correspondingly utilizable elastomers include, inter alia, those based on pure hydrocarbons, for example unsaturated polydienes such as natural or synthetically produced polyisoprene or polybutadiene, essentially chemically saturated elastomers, for example saturated ethylene-propylene copolymers, α-olefin copolymers, polyisobutylene, butyl rubber, ethylene-propylene rubber, and chemically functionalized hydrocarbons, for example halogenated, acrylated, allyl or vinyl ether-containing polyolefins,
- preferably with a proportion of 0.2% to 10% by weight, based on the total weight of the PSA.

The nature and amount of the blend components can be selected as required. If additives (a4) are employed and are migratable, then additives of the same kind as (b4) are likewise employed in the carrier layer.

It is also in accordance with the invention when the adhesive composition does not have some of and preferably any of the admixtures mentioned in each case. If individual admixtures have migration potential, these substances are also employed in the formulations for the carrier layers B.

In one embodiment of the present invention, the PSA composition also comprises further additives; nonlimiting examples include crystalline or amorphous oxides, hydroxides, carbonates, nitrides, halides, carbides or mixed oxide/hydroxide/halide compounds of aluminium, of silicon, of zirconium, of titanium, of tin, of zinc, of iron or of the alkali metals/alkaline earth metals. These are essentially aluminas, for example aluminium oxides, boehmite, bayerite, gibbsite, diaspore and the like. Sheet silicates are very particularly suitable, for example bentonite, montmorillonite, hydrotalcite, hectorite, kaolinite, boehmite, mica, vermiculite or mixtures thereof. But it is also possible to use carbon blacks or further polymorphs of carbon, for instance carbon nanotubes.

The adhesive compositions may also be colored with dyes or pigments. The adhesive compositions may be white, black or colored.

The addition of silicas, advantageously of precipitated silica surface-modified with dimethyldichlorosilane, can be utilized in order to adjust the thermal shear strength of the PSA composition.

The PSA for the PSA layer is foamable or is in foamed form. For this purpose, foaming agents are provided in the formula. Highly preferred foaming agents utilized are microballoons in expanded or expandable form. However, chemical foaming agents may also be employed, alone or in combination with other foaming agents. PSAs may also be foamed or have been foamed physically, in other words by incorporation of compounds or mixtures of compounds in the form of gases or supercritical fluids.

Foaming is accomplished in particular by the introduction and subsequent expansion of microballoons.

"Microballoons" are understood to mean hollow microbeads that are elastic and hence expandable in their ground state, having a thermoplastic polymer shell. These beads have been filled with low-boiling liquids or liquefied gas. Shell material employed is especially polyacrylonitrile, PVDC, PVC or polyacrylates. Suitable low-boiling liquids are especially hydrocarbons from the lower alkanes, for example isobutane or isopentane, that are enclosed in the polymer shell under pressure as liquefied gas.

Action on the microballoons, especially by the action of heat, results in softening of the outer polymer shell. At the same time, the liquid blowing gas present within the shell is converted to its gaseous state. This causes irreversible extension and three-dimensional expansion of the microballoons. The expansion has ended when the internal and external pressure are balanced. Since the polymeric shell is conserved, what is achieved is thus a closed-cell foam.

A multitude of microballoon types is commercially available, which differ essentially in terms of their size (6 to 45 μm diameter in unexpanded state) and the starting temperatures that they require for expansion (75 to 220° C.). One example of commercially available microballoons is the Expancel® DU products (DU=dry unexpanded) from Akzo Nobel.

Unexpanded microballoon types are also available in the form of an aqueous dispersion having a solids/microballoon content of about 40% to 45% by weight, and additionally also in the form of polymer-bound microballoons (masterbatches), for example in ethyl-vinyl acetate with a microballoon concentration of about 65% by weight. Both the microballoon dispersions and the masterbatches, like the DU products, are suitable for production of a foamed PSA composition of the invention.

A foamed PSA composition of the invention can also be produced with what are called pre-expanded microballoons. In the case of this group, the expansion already takes place prior to mixing into the polymer matrix. Pre-expanded microballoons are commercially available, for example, under the Dualite® name or with the product designation Expancel xxx DE (dry expanded) from Akzo Nobel.

Preferred in accordance with the invention is for at least 90% of all cavities formed by microballoons to have a maximum diameter of 20 to 75 μm, more preferably of 25 to 65 μm. The "maximum diameter" refers to the maximum extent of a microballoon in any desired direction in space.

The diameters are determined from a cryofracture edge under the scanning electron microscope (SEM) at 500-times magnification. The diameter of each individual microballoon is determined graphically.

Where foaming takes place by means of microballoons, the microballoons may be supplied as a batch, a paste or an unextended or extended powder to the formulation. They may also be present in suspension in solvent.

The proportion of the microballoons in the adhesive is between 0.5% and 2.5% by weight, very particularly between 1.0% and 2.0% by weight, based in each case on the overall composition of the adhesive. The figure is based on unexpanded microballoons.

A polymer composition used as per the invention, comprising expandable hollow microbeads, may additionally also contain non-expandable hollow microbeads. What is crucial is merely that virtually all gas-containing caverns are closed by a permanently impervious membrane, no matter whether this membrane consists of an elastic and thermoplastically extensible polymer mixture or, for instance, of elastic and—within the spectrum of the temperatures possible in plastics processing—non-thermoplastic glass.

Also suitable for the PSA composition of the invention—selected independently of other additives—are solid polymer beads, hollow glass beads, solid glass beads, hollow ceramic beads, solid ceramic beads and/or solid carbon beads ("carbon microballoons").

The absolute density of a foamed PSA composition of the invention is preferably 450 to 950 kg/m$^3$, preferably 600 to 800 kg/m$^3$.

The relative density describes the ratio of the density of the foamed PSA composition of the invention to the density of the unfoamed PSA composition of the invention having an identical formulation. The relative density of a PSA composition of the invention is preferably 0.20 to 0.99, more preferably 0.30 to 0.90, especially 0.50 to 0.85.

In one preferred embodiment of the invention, the adhesive composition consists only of vinylaromatic block copolymers (a1), tackifying resins (a2), optionally plasticizing resins (a3), microballoons, and optionally the abovementioned additives (a4).

With further preference, the adhesive consists of the following composition:

| | |
|---|---|
| Vinylaromatic block copolymers | 40% to 55% by weight |
| Tackifying resins and optionally plasticizing resins | 40% to 59.3% by weight |
| Microballoons | 0.5% to 2.5% by weight |
| Additives | 0.2% to 10% by weight |

With further preference, the adhesive consists of the following composition:

| | |
|---|---|
| Vinylaromatic block copolymers | 45% to 55% by weight |
| Tackifying resins and optionally plasticizing resins | 40% to 54.3% by weight |
| Microballoons | 0.5% to 2.5% by weight |
| Additives | 0.2% to 10% by weight |

With further preference, the adhesive consists of the following composition:

| | |
|---|---|
| Vinylaromatic block copolymers | 40% to 55% by weight |
| Tackifying resins | 42.5% to 59.5% by weight |
| Microballoons | 0.5% to 2.5% by weight |

A further advantageous adhesive comprises the following composition or consists with particular preference of the following composition:

| | |
|---|---|
| Vinylaromatic triblock copolymers | 15% to 45% by weight |
| Vinylaromatic diblock copolymers | 10% to 35% by weight |
| Tackifying resins and optionally plasticizing resins | 40% to 59.3% by weight |
| Microballoons | 0.5% to 2.5% by weight |
| Additives | 0.2% to 10% by weight |

A further advantageous adhesive comprises the following composition or consists with particular preference of the following composition:

| | |
|---|---|
| Vinylaromatic multiblock copolymers | 15% to 45% by weight |
| Vinylaromatic diblock copolymers | 10% to 35% by weight |
| Tackifying resins and optionally plasticizing resins | 40% to 59.3% by weight |
| Microballoons | 0.5% to 2.5% by weight |
| Additives | 0.2% to 10% by weight |

A further advantageous adhesive comprises the following composition or consists with particular preference of the following composition:

| | |
|---|---|
| Vinylaromatic multiblock copolymers | 15% to 30% by weight |
| Vinylaromatic triblock copolymers | 5% to 30% by weight |
| Vinylaromatic diblock copolymers | 10% to 30% by weight |
| Tackifying resins and optionally plasticizing resins | 40% to 59.3% by weight |
| Microballoons | 0.5% to 2.5% by weight |
| Additives | 0.2% to 10% by weight |

2.) Extensible Carrier Layer B

Self-adhesive strips of the invention comprise at least one ply of an extensible carrier material.

Self-adhesive strips produced using the aforementioned foamed PSA layers are designed as single-sidedly or, in particular, double-sidedly self-adhesively furnished self-adhesive tapes having an intermediate carrier, which is arranged either in a PSA layer or between two PSA layers.

A preferred embodiment of the self-adhesive strip is one wherein the intermediate carrier consists only of a single layer of a formulation containing block copolymer.

The double-sided products here may have a symmetrical or an asymmetrical product construction.

Encompassed by the concept of the invention are constructions having an extensible intermediate carrier in the middle of the self-adhesive strip, in particular in the middle of the single PSA layer, where the extensibility of the intermediate carrier must be sufficient to permit detachment of the adhesive strip by extensive stretching even under difficult detachment conditions.

The maximum extension of the carrier layer in accordance with the invention is at least at the level of values of the maximum extension of the PSA layer(s). Preferably it is greater.

The at least one carrier layer consists of a formulation which is constructed on the basis of at least one polyvinylaromatic-polydiene block copolymer (b1) and at least one tackifying resin (b2).

Preferred as polyvinylaromatic-polydiene block copolymer (b1) is at least one synthetic rubber in the form of a block copolymer having an A-B-A, (A-B)$_n$, (A-B)$_n$X or (A-B-A)$_n$X structure,
in which
the A blocks are independently a polymer formed by polymerization of at least one vinylaromatic;
the B blocks are independently a polymer formed by polymerization of conjugated dienes having 4 to 18 carbon atoms, or in the polydiene block a partly hydrogenated derivative of such a polymer;

X is the radical of a coupling reagent or initiator; and n is an integer 2.

More particularly, all synthetic rubbers in the formulation for the carrier layer are block copolymers having a construction as set out above. The formulation for carrier layers may thus also comprise mixtures of various block copolymers having a construction as above.

Suitable block copolymers (vinylaromatic block copolymers) thus comprise one or more rubber-like blocks B (soft blocks). At least one block copolymer has two or more glass-like blocks A (hard blocks). A synthetic rubber in the carrier layer formulation of the invention is a block copolymer having an A-B-A, $(A-B)_2X$, $(A-B)_3X$ or $(A-B)_4X$ construction, where the above meanings are applicable to A, B and X. Most preferably, all synthetic rubbers in the carrier layer formulation are block copolymers having an A-B-A, $(A-B)_2X$, $(A-B)_3X$ or $(A-B)_4X$ construction, where the above meanings are applicable to A, B and X. More particularly, the synthetic rubber in the carrier layer formation is a mixture of block copolymers having an A-B-A, $(A-B)_2X$, $(A-B)_3X$ or $(A-B)_4X$ structure, preferably comprising at least triblock copolymers A-B-A or $(A-B)_2X$.

Additionally advantageous is a mixture of triblock copolymers and $(A-B)_n$- or $(A-B)_nX$ block copolymers where n is not less than 3. It is also possible for diblock copolymers A-B to be used in combination with the stated block copolymers. Since such copolymers, however, lead to a reduction in the tensile strength, their proportion will be minimized (and in particular will be less than 20% by weight, based on the total block copolymer fraction in the carrier layers formulation, being more particularly ≤18% by weight, very preferably 10% by weight). Advantageously they are omitted entirely.

The proportion of triblock copolymer or multiblock copolymer (linear or radial) is at least 80% by weight, preferably at least 90% by weight, in relation to the amount of all block copolymers in the elastomer part (b1). Among the triblock copolymers and multiblock copolymers, triblock copolymers are preferred.

As carrier layer formulation, preference is given to using those based on block copolymers comprising polymer blocks predominantly formed of vinylaromatics (A blocks), preferably styrene, and those predominantly formed by polymerization of 1,3-dienes (B blocks) such as, for example, butadiene and isoprene or a copolymer of these. The products in this case may also have partial hydrogenation in the diene block. With regard to partially hydrogenated derivatives, block copolymers especially suitable are those in which, in particular, any vinyl groups, i.e. repeating units, which are present in unsaturated form in the side chain, such as 1,2-polybutadiene, 1,2-polyisoprene or 3,4-polyisoprene, are present in hydrogenated form.

The block copolymers of the PSAs preferably possess polystyrene end blocks.

The block copolymers that result from the A and B blocks may contain identical or different B blocks. The block copolymers may have linear A-B-A structures. It is likewise possible to use block copolymers in radial form and star-shaped and linear multiblock copolymers. All the aforementioned polymers may be utilized alone or in a mixture with one another.

Rather than the preferred polystyrene blocks, vinylaromatics used may also be polymer blocks based on other aromatic-containing homo- and copolymers (preferably $C_8$ to $C_{12}$ aromatics) having glass transition temperatures of greater than 75° C., for example α-methylstyrene-containing aromatic blocks. In addition, it is also possible for identical or different A blocks to be present.

Vinylaromatics for formation of the A block preferably include styrene, α-methylstyrene and/or other styrene derivatives. The block A may therefore be in the form of a homo- or copolymer. More preferably the block A is a polystyrene.

Preferred conjugated dienes as monomers for the soft block B are especially selected from the group consisting of butadiene, isoprene, ethylbutadiene, phenylbutadiene, piperylene, pentadiene, hexadiene, ethylhexadiene and dimethylbutadiene, and any desired mixtures of these monomers. The B block may also be in the form of a homopolymer or copolymer.

More preferably, the conjugated dienes as monomers for the soft block B are selected from butadiene and isoprene. For example, the soft block B is a polyisoprene, a polybutadiene or a partly hydrogenated derivate of one of these two polymers, such as polybutylene-butadiene in particular; or is a polymer formed from a mixture of butadiene and isoprene. Very preferably the block B is a polybutadiene.

A blocks are also referred to as "hard blocks" in the context of this invention. B blocks, correspondingly, are also called "soft blocks" or "elastomer blocks". This is reflected by the inventive selection of the blocks in accordance with their glass transition temperatures (for A blocks at least 25° C., especially at least 50° C., and for B blocks at most 25° C., especially at most −25° C.).

The proportion of the vinylaromatic block copolymers, styrene block copolymers in particular, in one preferred embodiment, in total, based on the overall carrier layer formulation, is at least 40% by weight, preferably at least 45% by weight.

Too low a proportion of vinylaromatic block copolymers results in relatively low tensile strength of the carrier layer formulation, and so the resistance to tears, a quantity which is required for stripping, is too low.

The maximum proportion of the vinylaromatic block copolymers, styrene block copolymers in particular, in total, based on the overall PSA, is at most 60% by weight, preferably at most 55% by weight. If the elastomer content is too high, the force required for extension (stripping force) becomes too high.

The fraction of vinylaromatic block copolymers, especially styrene block copolymers, in the carrier layer formulation may be selected exactly as it also occurs in the PSA layers. With regard to optimum resistance to tears, however, the tendency would be to select a higher fraction.

The fraction of polyvinylaromatics, especially polystyrene, in the vinylaromatic block copolymers, especially styrene block copolymers, for the carrier layer formulations is at least 20% by weight, preferably at least 25% by weight, and not more than 45% by weight, preferably not more than 35% by weight. The weight-average molar mass of the vinylaromatic block copolymers, especially styrene block copolymers, for the carrier layer formulations is at least 85 000 g/mol, preferably at least 100 000 g/mol. An architecture of this kind for the vinylaromatic block copolymers, especially styrene block copolymers, for the carrier layer formulations results in a maximum tensile strength for the carrier layer, this being important for the detachment operation.

Besides the at least one vinylaromatic block copolymer (b1), the carrier layer formulations comprise at least one tackifying resin (b2). The fraction of tackifying resin (b2) in carrier layer formulations counteracts migration of tackifying resins from the PSA layers into the carrier layer or layers, meaning that adhesive properties change only as little as possible, or not at all, over time. For the carrier layer formulations, therefore, the tackifying resins selected are the same as those also employed for the PSA layers. Accordingly, the definitions given for the tackifying resins for the PSA layers are also valid in connection with the tackifying resins for the carrier layer formulations.

The carrier layer formulations may also comprise one or more plasticizing resins (b3), further to the at least one vinylaromatic block copolymer (b1) and the at least one tackifying resin (b2), provided that a plasticizing resin is likewise employed in the PSA layer. The fraction of plasticizing resin (b3) in formulations for the carrier layer counteracts migration of plasticizing resins from the PSA layers into the carrier layer or layers, meaning that adhesive properties change only as little as possible, or not at all, over time. For the carrier layer formulations, therefore, the plasticizing resins selected are the same as those also employed for the PSA layers. Accordingly, the definitions given for the plasticizing resins for the PSA layers are also valid in connection with the plasticizing resins for the carrier layer formulations.

Further additives (b4) that can typically be utilized are:
primary antioxidants, for example sterically hindered phenols, preferably with a proportion of 0.2% to 1% by weight, based on the total weight of the carrier layer formulation,
secondary antioxidants, for example phosphites, thioesters or thioethers, preferably with a proportion of 0.2% to 1% by weight, based on the total weight of the carrier layer formulation,
process stabilizers, for example carbon radical scavengers, preferably with a proportion of 0.2% to 1% by weight, based on the total weight of the carrier layer formulation,
light stabilizers, for example UV absorbers or sterically hindered amines, preferably with a proportion of 0.2% to 1% by weight, based on the total weight of the carrier layer formulation,
processing auxiliaries, preferably with a proportion of 0.2% to 1% by weight, based on the total weight of the carrier layer formulation,
end block reinforcer resins, preferably with a proportion of 0.2% to 10% by weight, based on the total weight of the carrier layer formulation, and
optionally further polymers that are preferably elastomeric in nature; correspondingly utilizable elastomers include, inter alia, those based on pure hydrocarbons, for example unsaturated polydienes such as natural or synthetically produced polyisoprene or polybutadiene, essentially chemically saturated elastomers, for example saturated ethylene-propylene copolymers, α-olefin copolymers, polyisobutylene, butyl rubber, ethylene-propylene rubber, and chemically functionalized hydrocarbons, for example halogenated, acrylated, allyl or vinyl ether-containing polyolefins, preferably with a proportion of 0.2% to 10% by weight, based on the total weight of the carrier layer formulation.

The nature and amount of the blend components can be selected as required. If additives (b4) are employed and are migratable, then additives of the same kind are likewise employed as (a4) in the layer or layers of adhesive.

It is also in accordance with the invention when the carrier layer formulation does not have some of and preferably any of the admixtures mentioned in each case. If individual admixtures have migration potential, these substances are also employed in the PSA layers.

In one embodiment of the present invention, the carrier layer formulation also comprises further additives; nonlimiting examples include crystalline or amorphous oxides, hydroxides, carbonates, nitrides, halides, carbides or mixed oxide/hydroxide/halide compounds of aluminium, of silicon, of zirconium, of titanium, of tin, of zinc, of iron or of the alkali metals/alkaline earth metals. These are essentially aluminas, for example aluminium oxides, boehmite, bayerite, gibbsite, diaspore and the like. Sheet silicates are very particularly suitable, for example bentonite, montmorillonite, hydrotalcite, hectorite, kaolinite, boehmite, mica, vermiculite or mixtures thereof. But it is also possible to use carbon blacks or further polymorphs of carbon, for instance carbon nanotubes.

The carrier layer formulations may also be colored with dyes or pigments. The adhesive compositions may be white, black or colored.

The addition of silicas, advantageously of precipitated silica surface-modified with dimethyldichlorosilane, can be utilized in order to adjust the thermal shear strength of the carrier layer.

The carrier layer is preferably substantially unfoamed, in order to achieve maximum resistance to tears during stripping.

According to one preferred embodiment of the invention, the formulation for the carrier layer consists only of vinylaromatic block copolymers (b1), tackifying resins (b2) and optionally the aforementioned additives (b4).

With further preference the carrier layer formulation consists of the following composition:

| | |
|---|---|
| Vinylaromatic block copolymers | 40% to 60% by weight |
| Tackifying resins and optionally plasticizing resins | 40% to 59.8% by weight |
| Additives | 0.2% to 10% by weight |

With further preference the carrier layer formulation consists of the following composition:

| | |
|---|---|
| Vinylaromatic block copolymers | 45% to 55% by weight |
| Tackifying resins and optionally plasticizing resins | 40% to 54.8% by weight |
| Additives | 0.2% to 10% by weight |

With further preference the carrier layer formulation consists of the following composition:

| | |
|---|---|
| Vinylaromatic block copolymers | 40% to 60% by weight |
| Tackifying resins | 40% to 60% by weight |

With further preference the carrier layer formulation consists of the following composition:

| | |
|---|---|
| Vinylaromatic triblock copolymers | 35% to 59.8% by weight |
| Tackifying resins and optionally plasticizing resins | 40% to 64.8% by weight |
| Additives | 0.2% to 10% by weight |

The carriers may have a multi-ply architecture.

The thickness of the carrier layer B is in the range from 70 to 150 μm, preferably between 80 and 120 μm. Highly suitable for thin self-adhesive strips are carrier layers having a thickness of about 80 µm or about 90 µm or about 100 µm.

The density of the carrier layer B is in particular at least 950 g/cm³.

The carriers may, furthermore, have outer layers, examples being blocking layers, which prevent penetration of components from the adhesive into the intermediate carrier or vice versa. On account of the use of identical tackifying resins in PSA layer(s) and carrier layer(s), such blocking layers are not absolutely necessary for this purpose, however. These outer layers may also have barrier properties, in order thus to prevent diffusion of water vapour and/or oxygen through the layers.

For more effective anchoring of the PSAs on the carrier, the carriers may be pretreated using the known measures such as corona, plasma or flaming. The use of a primer is also possible. Ideally, however, there is no need for pretreatment.

The reverse of the carrier may have been subjected to an anti-adhesive physical treatment or coating, particularly in the case of single-sidedly self-adhesive products with pressure-sensitive qualities.

The carrier layer B has an elongation at break $\varepsilon_{max}$ (B) which very preferably is greater than the elongation at break of the PSA layer A $\varepsilon_{max}$(A). The effect of this is that the carrier layer can be extended beyond the state at which a state of orientation needed for detachment is already generated for the PSA layer, in other words close to $\varepsilon_{max}$(A).

Lastly, the PSA strip may be lined on one or both sides with a liner, that being a temporary carrier, which is anti-adhesively coated on one or both sides. A liner (release paper, release film) is not part of an adhesive tape, but is merely an aid to its production, storage, or for further processing by die-cutting. Furthermore, unlike an adhesive tape carrier, a liner is not firmly connected to a layer of adhesive.

The force at 50% elongation that is required for extension ought to be less than 20 N/cm, preferably less than 10 N/cm, in order to allow simple detachment without excessively large expenditure of force.

Particularly advantageous is a self-adhesive strip consisting of
  a single-layer intermediate carrier, preferably of resin-modified polystyrene-polybutadiene block copolymer, with the carrier having an elongation at break of at least 800%, preferably 1000%, and optionally a resilience of more than 50%, and with the tensile strength of the carrier being at least 8 MPa and preferably at most 20 MPa, suitably between 10 MPa and 15 MPa, where
  a PSA layer comprising the foamed PSA is applied to each of both sides of the carrier, these PSA layers being based on polystyrene-polybutadiene block copolymers and tackifying resins, the composition of the PSAs with further preference being identical, and where
  resin employed in PSA layers and carrier layer is of the same type and is present in substantially the same amount in respect of the proportion of polybutadiene blocks in the respective layers.

Particularly advantageous, moreover, is a self-adhesive strip consisting of
  a single-layer intermediate carrier, preferably of resin-modified polystyrene-polyisoprene block copolymer, with the carrier having an elongation at break of at least 1000%, preferably 1200%, and optionally a resilience of more than 50%, and with the tensile strength of the carrier being at least 8 MPa and preferably at most 20 MPa, suitably between 10 MPa and 15 MPa, where
  a PSA layer comprising the foamed PSA is applied to each of both sides of the carrier, these PSA layers being based on polystyrene-polydiene block copolymers and tackifying resins, the composition of the PSAs with further preference being identical, and where
  resin employed in PSA layers and carrier layer is of the same type.

Particularly advantageous, moreover, is a self-adhesive strip consisting of
  a single-layer intermediate carrier, preferably of resin-modified polystyrene-polydiene block copolymer, with the carrier having an elongation at break of at least 800%, preferably 1000%, and optionally a resilience of more than 50%, and with the tensile strength of the carrier being at least 8 MPa and preferably at most 20 MPa, suitably between 10 MPa and 15 MPa, where
  a PSA layer comprising the foamed PSA is applied to each of both sides of the carrier, these PSA layers being based on polystyrene-polybutadiene-butylene block copolymers and tackifying resins, the composition of the PSAs with further preference being identical, and where
  resin employed in PSA layers and carrier layer is of the same type.

The production and processing of the PSAs may take place either from solution or from the melt. Application of the PSAs to the carrier layer may take place by direct coating or by lamination, more particularly hot lamination.

The production and processing of the extensible carrier layer may, independently, likewise take place either from solution or from the melt. Application of the PSAs to the intermediate carrier layer may take place by direct coating or by lamination, more particularly hot lamination. The multilayer construction may also be produced by coextrusion.

The production of an adhesive of the invention comprising expanded microballoons may advantageously proceed such that
  the constituents for forming the adhesive such as polymers, resins or fillers and unexpanded microballoons are mixed in a first mixing unit and are heated to expansion temperature under elevated pressure,
  the microballoons are expanded on exit from the mixing unit,
  the adhesive composition mixture along with the expanded microballoons is formed into a layer in a roll applicator,
  the adhesive composition mixture along with the expanded microballoons is optionally applied to a carrier or release material in web form.

To produce an inventively utilizable adhesive comprising expanded microballoons it is possible to employ any methods according to the prior art. In this regard, reference may be made in particular to the information in DE 10 2015 206 076 A1.

Typical processed forms of the self-adhesive strips of the invention are adhesive tape rolls and also adhesive strips, of the kind obtained in the form of die-cuts, for example.

All layers preferably essentially have the form of a cuboid. With further preference, all layers are joined to one another over their full area.

Optionally there may be a non-adhesive grip-tab region provided, from which the detachment operation can be performed.

The general expression "adhesive tape" for the purposes of this invention encompasses all sheet-like structures such as two-dimensionally extended films or film sections, tapes with extended length and limited width, tape sections, die-cuts, labels and the like.

The self-adhesive film strip of the invention preferably has a thickness of 90 μm to 250 μm, more preferably of 100 to 175 μm. Very advantageous is a thickness of about 125 μm or of about 150 μm.

Example of embodiments (outer layer|carrier layer|optional outer layer) are

20 μm|70 μm=90 μm
20 μm|80 μm=100 μm
20 μm|70 μm 120 μm=110 μm
50 μm|150 μm|50 μm=250 μm
25 μm|100 μm|25 μm=150 μm
50 μm|100 μm 50 μm=200 μm
35 μm|80 μm|35 μm=150 μm
75 μm|100 μm|75 μm=250 μm

The self-adhesive strips of the invention are especially suitable for bonding components in mobile devices. For this purpose they meet the following requirements:

| Property | Measurement method | Typical range | Preferred range | Very preferred range |
|---|---|---|---|---|
| Shock resistance | DuPont z | ≥500 mJ | ≥650 mJ | ≥800 mJ |
| Bond strength | Peel adhesion on steel | ≥7.0 N/cm | ≥8.5 N/cm | ≥10.0 N/cm |
| Resistance to tears | Stripping test | Max. 1/3 torn at 700 mm/min | Max. 1/3 torn at 800 mm/min | Max. 0/3 torn at 800 mm/min |

With reference to the figures and examples described hereinafter, particularly advantageous embodiments of the invention are elucidated in more detail, without any intention thereby to subject the invention to unnecessary restriction.

In the drawings:

FIG. 1 shows the self-adhesive strip of the invention composed of three layers 1, 2, 3, which can be redetached by extensive stretching.

The strip consists of a carrier 1, the carrier 1 being of single-layer embodiment. On the carrier there are external PSA layers 2, 3 of the invention on either side.

The protruding end of the carrier layer 1 may serve as a grip tab, but is not necessarily present.

Figure 1:
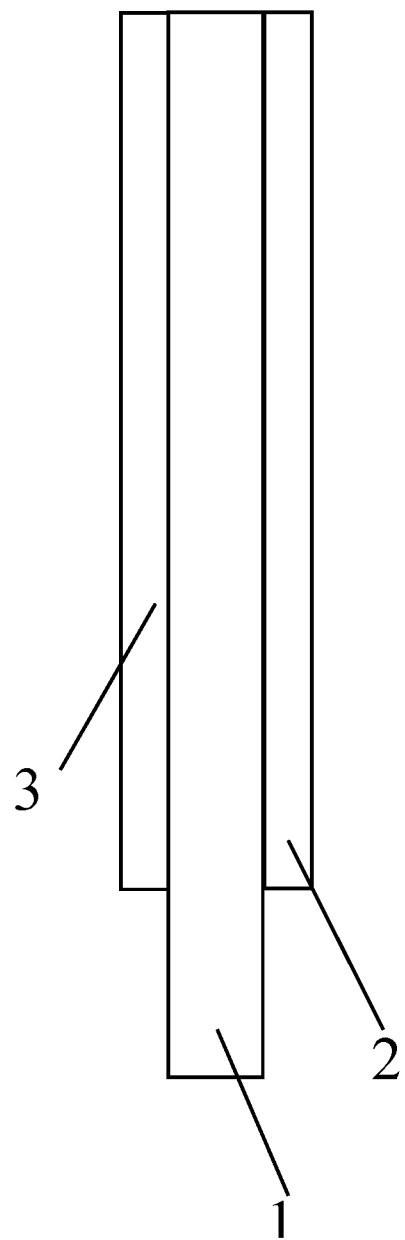
FIG. 1 shows a three-layer pressure-sensitive self-adhesive strip of the invention.
Figure 2:
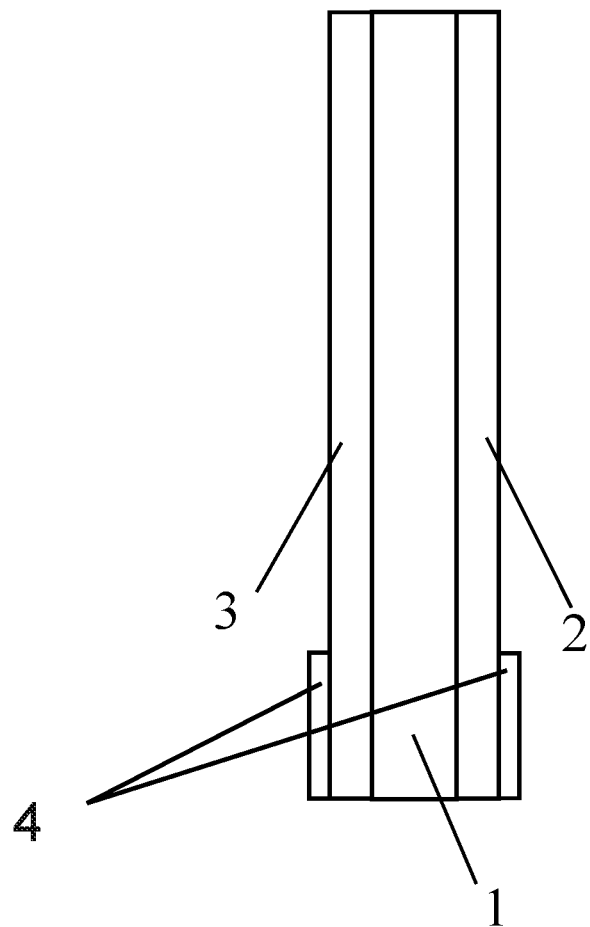
FIG. 2 shows a three-layer pressure-sensitive self-adhesive strip of the invention in an alternative embodiment.

In FIG. 2, the pressure-sensitive self-adhesive strip of the invention is shown in a variant. The self-adhesive strip consists of three layers 1, 2, 3, which are arranged congruently one above another.

In order to produce a grip tab for pulling, to achieve the extensive stretching, one end of the self-adhesive film strip is made non-adhesive on both sides, by the application of preferably siliconized pieces of film or of paper 4.

The invention below is elucidated in more detail by a number of examples, without thereby wishing to restrict the invention in any form whatsoever.

Pressure-Sensitive Adhesives

The constituents of the pressure-sensitive adhesives (PSAs) were dissolved in this case at 40% in benzene/toluene/acetone, admixed with a benzene slurry of the microballoons, and coated out with a coating bar onto a PET film furnished with a silicone release in the desired layer thickness, after which the solvent was evaporated off at 100° C. for 15 minutes in order to dry the adhesive layer. In the examples given, this is possible because in this case microballoons are utilized which have an expansion temperature above 100° C. When using other microballoons, the skilled person selects production temperatures suitable accordingly, without departing from the scope of the present invention.

After the drying, the adhesive layer was lined with a second ply of PET liner, free from any air inclusions, and foamed in an oven between the two liners at 150° C. for 5 minutes. Foaming between two liners allows products to be obtained that have particularly smooth surfaces. All of the examples given feature an $R_a$ of less than 15 μm. $R_a$, the arithmetic mean roughness, is the arithmetic mean value of all profile values of the roughness profile.

Carrier Layers

The constituents of the formulations for the carrier layers were dissolved in this case at 40% in benzine/toluene/acetone and the solution was coated out with a coating bar onto a PET film furnished with a silicone release in the desired layer thickness, after which the solvents evaporated off at 100° C. for 15 minutes to dry the layer of composition.

Production of the Multilayer Self-Adhesive Strips

To produce the multilayer self-adhesive strips, two plies of a foamed pressure-sensitive adhesive layer and one ply of a carrier layer in each case were made ready. Using a rubber roller, a ply of a layer of pressure-sensitive adhesive was first laminated manually onto the first surface of the carrier layer, without bubbles, after which a second layer of pressure-sensitive adhesive was laminated onto a second surface of the carrier layer. For this purpose, in each case, liners were removed beforehand from the surfaces of the individual plies that were to be contacted. Adhesive strips in the desired dimensions were obtained by diecutting.

EXAMPLES

Raw Materials Used

| | Raw material | Nature | Characteristics |
|---|---|---|---|
| Elastomer part (a1) and/or (b1) | KRATON ® D1102 AS polymer | Linear SBS | PS fraction: 29%** Diblock fraction: 17%** |
| | KRATON ® D1118 ES polymer | Linear SBS | PS fraction: 33%** Diblock fraction: 78%** M.W. (Triblock): 150 000 g/mol |
| | KRATON ® D1116 AT polymer | Radial SBS | PS fraction: 23%** Diblock fraction: 16%** M.W. (Multiblock radial): 300 000 g/mol |
| | KRATON ® D1101 AS polymer | Linear SBS | PS fraction: 31%** Diblock fraction: 16%** M.W. (Triblock): 150 000 g/mol |
| | VECTOR ® 4111N resin | Linear SIS | PS fraction: 18%*** Diblock fraction: < 1%*** M.W. (Triblock): 150 000 g/mol |

| Raw material | Nature | Characteristics |
|---|---|---|
| KRATON ® D1165 PT polymer | Linear SIS | PS fraction: 30%** Diblock fraction: 20%** M.W. (Triblock): 120 000 g/mol |
| Tackifying resin part (a2) and/or (b2) PICCOLYTE ® A115 (Pinova Inc.) | Poly-α-terpene | Softening temperature: 115° C. |
| DERCOLYTE ™ A115 (Les Dérivés Résiniques & Terpéniques) | Poly-α-terpene | Softening temperature: 115° C. |
| Plasticizing resin part (a3) and/or (b3) WINGTACK ® 10 (Cray Valley USA, LLC) | Liquid C5 hydrocarbon resin | |
| Additives (a4) and/or (b4) IRGANOX ® 1010 (BASF SE) | Primary ageing inhibitor | |
| Microballoons | EXPANCEL ® 920 DU20 (Akzo Nobel Pulp and Performance Chemicals AB) | |

SBS: Polystyrene-polybutadiene block copolymer
SIS: Polystyrene-polyisoprene block copolymer
PS: Polystyrene

Example 1.1 (Inventive)

| | | Type | Fraction |
|---|---|---|---|
| Adhesive A1 | Elastomer part | KRATON ® D1102 AS polymer | 42.0 wt % |
| | | KRATON ® D1118 ES polymer | 8.0 wt % |
| | Resin part | PICCOLYTE ® A115 | 48.5 wt % |
| | Plasticizing resin part | -/- | |
| | Additives | IRGANOX ® 1010 | 0.5 wt % |
| | Microballoons | EXPANCEL ® 920 DU20 | 1.0 wt % |
| | Thickness* | | 50 μm |
| Carrier B | Elastomer part | KRATON ® D1102 AS polymer | 50.0 wt % |
| | Resin part | PICCOLYTE ™ A115 | 49.5 wt % |
| | Plasticizing resin part | -/- | |
| | Additives | IRGANOX ® 1010 | 0.5 wt % |
| | Thickness | | 80 μm |
| Adhesive A2 | Elastomer part | KRATON ® D1102 AS polymer | 42.0 wt % |
| | | KRATON ® D1118 ES polymer | 8.0 wt % |
| | Resin | PICCOLYTE ® A115 | 48.5 wt % |
| | Plasticizing resin part | -/- | |
| | Additives | IRGANOX ® 1010 | 0.5 wt % |
| | Microballoons | EXPANCEL ® 920 DU20 | 1.0 wt % |
| | Thickness* | | 50 μm |

Example 1.2 (Inventive)

| | | Type | Fraction |
|---|---|---|---|
| Adhesive A1 | Elastomer part | KRATON ® D1102 AS polymer | 42.0 wt % |
| | | KRATON ® D1118 ES polymer | 8.0 wt % |
| | Resin part | PICCOLYTE ™ A115 | 48.5 wt % |
| | Plasticizing resin part | -/- | |
| | Additives | IRGANOX ® 1010 | 0.5 wt % |
| | Microballoons | EXPANCEL ® 920 DU20 | 1.0 wt % |
| | Thickness* | | 50 μm |
| Carrier B | Elastomer part | KRATON ® D1102 AS polymer | 50.0 wt % |
| | Resin part | PICCOLYTE ™ A115 | 49.5 wt % |
| | Plasticizing resin part | -/- | |
| | Additives | IRGANOX ® 1010 | 0.5 wt % |
| | Thickness | | 100 μm |
| Adhesive A2 | Elastomer part | KRATON ® D1102 AS polymer | 42.0 wt % |
| | | KRATON ® D1118 ES polymer | 8.0 wt % |
| | Resin part | PICCOLYTE ™ A115 | 48.5 wt % |
| | Plasticizing resin part | -/- | |
| | Additives | IRGANOX ® 1010 | 0.5 wt % |
| | Microballoons | EXPANCEL ® 920 DU20 | 1.0 wt % |
| | Thickness* | | 50 μm |

Example 1.3 (Inventive)

| | | Type | Fraction |
|---|---|---|---|
| Adhesive A1 | Elastomer part | KRATON ® D1102 AS polymer | 42.0 wt % |
| | | KRATON ® D1118 ES polymer | 8.0 wt % |
| | Resin part | PICCOLYTE ® A115 | 48.5 wt % |
| | Plasticizing resin part | -/- | |
| | Additives | IRGANOX ® 1010 | 0.5 wt % |
| | Microballoons | EXPANCEL ® 920 DU20 | 1.0 wt % |
| | Thickness* | | 50 μm |
| Carrier B | Elastomer part | KRATON ® D1102 AS polymer | 50.0 wt % |
| | Resin part | PICCOLYTE ® A115 | 49.5 wt % |
| | Plasticizing resin part | -/- | |
| | Additives | IRGANOX ® 1010 | 0.5 wt % |
| | Thickness | | 70 μm |
| Adhesive A2 | Elastomer part | KRATON ® D1102 AS polymer | 42.0 wt % |
| | | KRATON ® D1118 ES polymer | 8.0 wt % |
| | Resin part | PICCOLYTE ® A115 | 48.5 wt % |
| | Plasticizing resin part | -/- | |

Example 2.1 (Comparative) — continued

|  | Type | Fraction |
|---|---|---|
| Additives | IRGANOX ® 1010 | 0.5 wt % |
| Microballoons | EXPANCEL ® 920 DU20 | 1.0 wt % |
| Thickness* |  | 50 μm |

Example 2.2 (Comparative)

|  |  | Type | Fraction |
|---|---|---|---|
| Adhesive A1 | Elastomer part | KRATON ® D1102 AS polymer | 42.0 wt % |
|  |  | KRATON ® D1118 ES polymer | 8.0 wt % |
|  | Resin part | DERCOLYTE ™ A115 | 45.5 wt % |
|  | Plasticizing resin part | WINGTACK ® 10 | 3.0 wt % |
|  | Additives | IRGANOX ® 1010 | 0.5 wt % |
|  | Microballoons | EXPANCEL ® 920 DU20 | 1.0 wt % |
|  | Thickness* |  | 50 μm |
| Carrier B | Elastomer part | KRATON ® D1101 AS polymer | 50.0 wt % |
|  | Resin part | DERCOLYTE ™ A115 | 46.5 wt % |
|  | Plasticizing resin part | WINGTACK ® 10 | 3.0 wt % |
|  | Additives | IRGANOX ® 1010 | 0.5 wt % |
|  | Thickness |  | 30 μm |
| Adhesive A2 | Elastomer part | KRATON ® D1102 AS polymer | 42.0 wt % |
|  |  | KRATON ® D1118 ES polymer | 8.0 wt % |
|  | Resin part | DERCOLYTE ™ A115 | 45.5 wt % |
|  | Plasticizing resin part | WINGTACK ® 10 | 3.0 wt % |
|  | Additives | IRGANOX ® 1010 | 0.5 wt % |
|  | Microballoons | EXPANCEL ® 920 DU20 | 1.0 wt % |
|  | Thickness* |  | 50 μm |

Example 2.3 (Inventive) — continued

|  | Type | Fraction |
|---|---|---|
| Plasticizing resin part | WINGTACK ® 10 | 3.0 wt % |
| Additives | IRGANOX ® 1010 | 0.5 wt % |
| Microballoons | EXPANCEL ® 920 DU20 | 1.0 wt % |
| Thickness* |  | 50 μm |

Example 2.3 (Inventive)

|  |  | Type | Fraction |
|---|---|---|---|
| Adhesive A1 | Elastomer part | KRATON ® D1102 AS polymer | 42.0 wt % |
|  |  | KRATON ® D1118 ES polymer | 8.0 wt % |
|  | Resin part | DERCOLYTE ™ A115 | 45.5 wt % |
|  | Plasticizing resin part | WINGTACK ® 10 | 3.0 wt % |
|  | Additives | IRGANOX ® 1010 | 0.5 wt % |
|  | Microballoons | EXPANCEL ® 920 DU20 | 1.0 wt % |
|  | Thickness* |  | 50 μm |
| Carrier B | Elastomer part | KRATON ® D1101 AS polymer | 50.0 wt % |
|  | Resin part | DERCOLYTE ™ A115 | 46.5 wt % |
|  | Plasticizing resin part | WINGTACK ® 10 | 3.0 wt % |
|  | Additives | IRGANOX ® 1010 | 0.5 wt % |
|  | Thickness |  | 80 μm |
| Adhesive A2 | Elastomer part | KRATON ® D1102 AS polymer | 42.0 wt % |
|  |  | KRATON ® D1118 ES polymer | 8.0 wt % |
|  | Resin part | DERCOLYTE ™ A115 | 45.5 wt % |
|  | Plasticizing resin part | WINGTACK ® 10 | 3.0 wt % |
|  | Additives | IRGANOX ® 1010 | 0.5 wt % |
|  | Microballoons | EXPANCEL ® 920 DU20 | 1.0 wt % |
|  | Thickness* |  | 50 μm |

Example 2.4 (Inventive)

|  |  | Type | Fraction |
|---|---|---|---|
| Adhesive A1 | Elastomer part | KRATON ® D1102 AS polymer | 42.0 wt % |
|  |  | KRATON ® D1118 ES polymer | 8.0 wt % |
|  | Resin part | DERCOLYTE ™ A115 | 45.5 wt % |
|  | Plasticizing resin part | WINGTACK ® 10 | 3.0 wt % |
|  | Additives | IRGANOX ® 1010 | 0.5 wt % |
|  | Microballoons | EXPANCEL ® 920 DU20 | 1.0 wt % |
|  | Thickness* |  | 50 μm |
| Carrier B | Elastomer part | KRATON ® D1101 AS polymer | 50.0 wt % |
|  | Resin part | DERCOLYTE ™ A115 | 46.5 wt % |
|  | Plasticizing resin part | WINGTACK ® 10 | 3.0 wt % |
|  | Additives | IRGANOX ® 1010 | 0.5 wt % |
|  | Thickness |  | 100 μm |
| Adhesive A2 | Elastomer part | KRATON ® D1102 AS polymer | 42.0 wt % |
|  |  | KRATON ® D1118 ES polymer | 8.0 wt % |
|  | Resin part | DERCOLYTE ™ A115 | 45.5 wt % |

|  | Type | Fraction |
|---|---|---|
| Plasticizing resin part | WINGTACK® 10 | 3.0 wt % |
| Additives | IRGANOX® 1010 | 0.5 wt % |
| Microballoons | EXPANCEL® 920 DU20 | 1.0 wt % |
| Thickness* |  | 50 μm |

Example 3.1 (Comparative)

|  |  | Type | Fraction |
|---|---|---|---|
| Adhesive A1 | Elastomer part | KRATON® D1102 AS polymer | 42.0 wt % |
|  |  | KRATON® D1118 ES polymer | 8.0 wt % |
|  | Resin part | PICCOLYTE® A115 | 45.5 wt % |
|  | Plasticizing resin part | WINGTACK® 10 | 3.0 wt % |
|  | Additives | IRGANOX® 1010 | 0.5 wt % |
|  | Microballoons | EXPANCEL® 920 DU20 | 1.0 wt % |
|  | Thickness* |  | 50 μm |
| Carrier B | Polyurethane film | Polyethylene-coated thermoplastic polyurethane |  |
|  | Thickness |  | 80 μm |
| Adhesive A2 | Elastomer part | KRATON® D1102 AS polymer | 42.0 wt % |
|  |  | KRATON® D1118 ES polymer | 8.0 wt % |
|  | Resin part | PICCOLYTE® A115 | 45.5 wt % |
|  | Plasticizing resin part | WINGTACK® 10 | 3.0 wt % |
|  | Additives | IRGANOX® 1010 | 0.5 wt % |
|  | Microballoons | EXPANCEL® 920 DU20 | 1.0 wt % |
|  | Thickness* |  | 50 μm |

Example 4.1 (Comparative)

|  |  | Type | Fraction |
|---|---|---|---|
| Adhesive A1 | Elastomer part | KRATON® D1102 AS polymer | 42.0 wt % |
|  |  | KRATON® D1118 ES polymer | 8.0 wt% |
|  | Resin part | DERCOLYTE™ A115 | 46.5 wt % |
|  | Plasticizing resin part | WINGTACK® 10 | 3.0 wt % |
|  | Additives | IRGANOX® 1010 | 0.5 wt % |
|  | Microballoons | -/- | Unfoamed |
|  | Thickness |  | 50 μm |
| Carrier B | Elastomer part | KRATON® D1102 AS polymer | 42.0 wt% |
|  |  | KRATON® D1118 ES polymer | 8.0 wt % |
|  | Resin part | DERCOLYTE™ A115 | 46.5 wt % |
|  | Plasticizing resin part | WINGTACK® 10 | 3.0 wt % |
|  | Additives | IRGANOX® 1010 | 0.5 wt % |
|  | Thickness |  | 50 μm |
| Adhesive A2 | Elastomer part | KRATON® D1102 AS polymer | 42.0 wt % |
|  |  | KRATON® D1118 ES polymer | 8.0 wt % |
|  | Resin part | DERCOLYTE™ A115 | 46.5 wt % |
|  | Plasticizing resin part | WINGTACK® 10 | 3.0 wt % |
|  | Additives | IRGANOX® 1010 | 0.5 wt % |
|  | Microballoons | -/- | Unfoamed |
|  | Thickness |  | 50 μm |

Example 4.2 (Comparative)

|  |  | Type | Fraction |
|---|---|---|---|
| Adhesive A1 | Elastomer part | KRATON® D1102 AS polymer | 42.0 wt % |
|  |  | KRATON® D1118 ES polymer | 8.0 wt % |
|  | Resin part | PICCOLYTE® A115 | 45.5 wt % |
|  | Plasticizing resin part | WINGTACK® 10 | 3.0 wt % |
|  | Additives | IRGANOX® 1010 | 0.5 wt % |
|  | Microballoons | EXPANCEL® 920 DU20 | 1.0 wt % |
|  | Thickness* |  | 50 μm |
| Carrier B | Elastomer part | KRATON® D1102 AS polymer | 42.0 wt % |
|  |  | KRATON® D1118 ES polymer | 8.0 wt % |
|  | Resin part | PICCOLYTE® A115 | 45.5 wt % |
|  | Plasticizing resin part | WINGTACK® 10 | 3.0 wt% |
|  | Additives | IRGANOX® 1010 | 0.5 wt% |
|  | Microballoons | EXPANCEL® 920 DU20 | 1.0 wt% |
|  | Thickness* |  | 50 μm |
| Adhesive A2 | Elastomer part | KRATON® polymer D1102 AS | 42.0 wt % |
|  |  | KRATON® polymer D1118 ES | 8.0 wt % |
|  | Resin part | PICCOLYTE® A115 | 45.5 wt % |
|  | Plasticizing resin part | WINGTACK® 10 | 3.0 wt % |
|  | Additives | IRGANOX® 1010 | 0.5 wt % |
|  | Microballoons | EXPANCEL® 920 DU20 | 1.0 wt % |
|  | Thickness* |  | 50 μm |

Example 5.1 (Comparative)

|  |  | Type | Fraction |
|---|---|---|---|
| Adhesive A1 | Elastomer part | KRATON® D1102 AS polymer | 42.0 wt % |
|  |  | KRATON® D1118 ES polymer | 8.0 wt % |

|  |  | Type | Fraction |
|---|---|---|---|
|  | Resin part | PICCOLYTE® A115 | 45.5 wt % |
|  | Plasticizing resin part | WINGTACK® 10 | 3.0 wt % |
|  | Additives | IRGANOX® 1010 | 0.5 wt % |
|  | Microballoons | EXPANCEL® 920 DU20 | 1.0 wt % |
|  | Thickness* |  | 50 μm |
| Carrier B | Elastomer part | KRATON® D1102 AS polymer | 42.0 wt % |
|  |  | KRATON® D1118 ES polymer | 8.0 wt % |
|  | Resin part | DERCOLYTE™ A115 | 46.5 wt % |
|  | Plasticizing resin part | WINGTACK® 10 | 3.0 wt % |
|  | Additives | IRGANOX® 1010 | 0.5 wt % |
|  | Thickness |  | 80 μm |
| Adhesive A2 | Elastomer part | KRATON® D1102 AS polymer | 42.0 wt % |
|  |  | KRATON® D1118 ES polymer | 8.0 wt % |
|  | Resin part | PICCOLYTE® A115 | 45.5 wt % |
|  | Plasticizing resin part | WINGTACK® 10 | 3.0 wt % |
|  | Additives | IRGANOX® 1010 | 0.5 wt % |
|  | Microballoons | EXPANCEL® 920 DU20 | 1.0 wt % |
|  | Thickness* |  | 50 μm |

Example 6.1 (Inventive)

|  |  | Type | Fraction |
|---|---|---|---|
| Adhesive A1 | Elastomer part | KRATON® D1116 AT polymer | 18.0 wt % |
|  |  | KRATON® D1118 ES polymer | 30.0 wt % |
|  | Resin part | PICCOLYTE® A115 | 47.5 wt % |
|  | Plasticizing resin part | WINGTACK® 10 | 1.0 wt % |
|  | Additives | IRGANOX® 1010 | 0.5 wt % |
|  | Microballoons | EXPANCEL® 920 DU20 | 1.0 wt % |
|  | Thickness* |  | 25 μm |
| Carrier B | Elastomer part | KRATON® D1102 AS polymer | 50.0 wt % |
|  | Resin part | PICCOLYTE® A115 | 48.5 wt % |
|  | Plasticizing resin part | WINGTACK® 10 | 1.0 wt % |
|  | Additives | IRGANOX® 1010 | 0.5 wt % |
|  | Thickness |  | 100 μm |
| Adhesive A2 | Elastomer part | KRATON® D1116 AT polymer | 18.0 wt % |
|  |  | KRATON® D1118 ES polymer | 30.0 wt % |
|  | Resin part | PICCOLYTE® A115 | 47.5 wt % |
|  | Plasticizing resin part | WINGTACK® 10 | 1.0 wt % |
|  | Additives | IRGANOX® 1010 | 0.5 wt % |
|  | Microballoons | EXPANCEL® 920 DU20 | 1.0 wt % |
|  | Thickness* |  | 25 μm |

Example 6.2 (Inventive)

|  |  | Type | Fraction |
|---|---|---|---|
| Adhesive A1 | Elastomer part | KRATON® D1116 AT polymer | 18.0 wt % |
|  |  | KRATON® D1118 ES polymer | 30.0 wt % |
|  | Resin part | PICCOLYTE® A115 | 47.5 wt % |
|  | Plasticizing resin part | WINGTACK® 10 | 1.0 wt % |
|  | Additives | IRGANOX® 1010 | 0.5 wt % |
|  | Microballoons | EXPANCEL® 920 DU20 | 1.0 wt % |
|  | Thickness* |  | 35 μm |
| Carrier B | Elastomer part | KRATON® D1102 AS polymer | 50.0 wt % |
|  | Resin part | PICCOLYTE® A115 | 48.5 wt % |
|  | Plasticizing resin part | WINGTACK® 10 | 1.0 wt % |
|  | Additives | IRGANOX® 1010 | 0.5 wt % |
|  | Thickness |  | 80 μm |
| Adhesive A2 | Elastomer part | KRATON® D1116 AT polymer | 18.0 wt % |
|  |  | KRATON® D1118 ES polymer | 30.0 wt % |
|  | Resin part | PICCOLYTE® A115 | 47.5 wt % |
|  | Plasticizing resin part | WINGTACK® 10 | 1.0 wt % |
|  | Additives | IRGANOX® 1010 | 0.5 wt % |
|  | Microballoons | EXPANCEL® 920 DU20 | 1.0 wt % |
|  | Thickness* |  | 35 μm |

Example 7.1 (Comparative)

|  |  | Type | Fraction |
|---|---|---|---|
| Adhesive A1 | Elastomer part | KRATON® D1102 AS polymer | 42.0 wt % |
|  |  | KRATON® D1118 ES polymer | 8.0 wt % |
|  | Resin part | PICCOLYTE® A115 | 45.5 wt % |
|  | Plasticizing resin part | WINGTACK® 10 | 3.0 wt % |
|  | Additives | IRGANOX® 1010 | 0.5 wt % |
|  | Microballoons | EXPANCEL® 920 DU20 | 1.0 wt % |
|  | Thickness* |  | 50 μm |
| Carrier B | Elastomer part | VECTOR® 4111N resin | 50.0 wt % |
|  | Resin part | DERCOLYTE™ A115 | 46.5 wt % |
|  | Plasticizing resin part | WINGTACK® 10 | 3.0 wt % |

-continued

|  |  | Type | Fraction |
|---|---|---|---|
| Adhesive A2 | Additives | IRGANOX® 1010 | 0.5 wt % |
|  | Thickness |  | 50 μm |
|  | Elastomer part | KRATON® D1102 AS polymer | 42.0 wt % |
|  |  | KRATON® D1118 ES polymer | 8.0 wt % |
|  | Resin part | PICCOLYTE® A115 | 45.5 wt % |
|  | Plasticizing resin part | WINGTACK® 10 | 3.0 wt % |
|  | Additives | IRGANOX® 1010 | 0.5 wt % |
|  | Micro-balloons | EXPANCEL® 920 DU20 | 1.0 wt % |
|  | Thickness* |  | 50 μm |

Example 7.2 (Comparative)

|  |  | Type | Fraction |
|---|---|---|---|
| Adhesive A1 | Elastomer part | KRATON® D1102 AS polymer | 42.0 wt % |
|  |  | KRATON® D1118 ES polymer | 8.0 wt % |
|  | Resin part | PICCOLYTE® A115 | 45.5 wt % |
|  | Plasticizing resin part | WINGTACK® 10 | 3.0 wt % |
|  | Additives | IRGANOX® 1010 | 0.5 wt % |
|  | Micro-balloons | EXPANCEL® 920 DU20 | 1.0 wt % |
|  | Thickness* |  | 50 μm |
| Carrier B | Elastomer part | VECTOR® 4111N resin | 50.0 wt % |
|  | Resin part | PICCOLYTE® A115 | 46.5 wt % |
|  | Plasticizing resin part | WINGTACK® 10 | 3.0 wt % |
|  | Additives | IRGANOX® 1010 | 0.5 wt % |
|  | Thickness |  | 80 μm |
| Adhesive A2 | Elastomer part | KRATON® D1102 AS polymer | 42.0 wt % |
|  |  | KRATON® D1118 ES polymer | 8.0 wt % |
|  | Resin part | PICCOLYTE® A115 | 45.5 wt % |
|  | Plasticizing resin part | WINGTACK® 10 | 3.0 wt % |
|  | Additives | IRGANOX® 1010 | 0.5 wt % |
|  | Micro-balloons | EXPANCEL® 920 DU20 | 1.0 wt % |
|  | Thickness* |  | 50 μm |

Example 7.3 (Comparative)

|  |  | Type | Fraction |
|---|---|---|---|
| Adhesive A1 | Elastomer part | KRATON® D1102 AS polymer | 42.0 wt % |
|  |  | KRATON® D1118 ES polymer | 8.0 wt % |
|  | Resin part | PICCOLYTE® A115 | 45.5 wt % |
|  | Plasticizing resin part | WINGTACK® 10 | 3.0 wt % |
|  | Additives | IRGANOX® 1010 | 0.5 wt % |
|  | Micro-balloons | EXPANCEL® 920 DU20 | 1.0 wt % |
|  | Thickness* |  | 50 μm |
| Carrier B | Elastomer part | KRATON® D1165 PT polymer | 50.0 wt % |
|  | Resin part | DERCOLYTE™ A115 | 46.5 wt % |
|  | Plasticizing resin part | WINGTACK® 10 | 3.0 wt % |
|  | Additives | IRGANOX® 1010 | 0.5 wt % |
|  | Thickness |  | 50 μm |
| Adhesive A2 | Elastomer part | KRATON® D1102 AS polymer | 42.0 wt % |
|  |  | KRATON® D1118 ES polymer | 8.0 wt % |
|  | Resin part | PICCOLYTE® A115 | 45.5 wt % |
|  | Plasticizing resin part | WINGTACK® 10 | 3.0 wt % |
|  | Additives | IRGANOX® 1010 | 0.5 wt % |
|  | Micro-balloons | EXPANCEL® 920 DU20 | 1.0 wt % |
|  | Thickness* |  | 50 μm |

Example 7.4 (Comparative)

|  |  | Type | Fraction |
|---|---|---|---|
| Adhesive A1 | Elastomer part | KRATON® D1102 AS polymer | 42.0 wt % |
|  |  | KRATON® D1118 ES polymer | 8.0 wt % |
|  | Resin part | PICCOLYTE® A115 | 45.5 wt % |
|  | Plasticizing resin part | WINGTACK® 10 | 3.0 wt % |
|  | Additives | IRGANOX® 1010 | 0.5 wt % |
|  | Micro-balloons | EXPANCEL® 920 DU20 | 1.0 wt % |
|  | Thickness |  | 50 μm |
| Carrier B | Elastomer part | KRATON® D1165 PT polymer | 50.0 wt % |
|  | Resin part | DERCOLYTE™ A115 | 46.5 wt % |
|  | Plasticizing resin part | WINGTACK® 10 | 3.0 wt % |
|  | Additives | IRGANOX® 1010 | 0.5 wt % |
|  | Thickness |  | 80 μm |
| Adhesive A2 | Elastomer part | KRATON® D1102 AS polymer | 42.0 wt % |
|  |  | KRATON® D1118 ES polymer | 8.0 wt % |
|  | Resin part | PICCOLYTE® A115 | 45.5 wt % |
|  | Plasticizing resin part | WINGTACK® 10 | 3.0 wt % |
|  | Additives | IRGANOX® 1010 | 0.5 wt % |
|  | Micro-balloons | EXPANCEL® 920 DU20 | 1.0 wt % |
|  | Thickness* |  | 50 μm |

Example 8.1 (Comparative)

| | | Type | Fraction |
|---|---|---|---|
| Adhesive A1 | Elastomer part | KRATON ® D1102 AS polymer | 42.0 wt % |
| | | KRATON ® D1118 ES polymer | 8.0 wt % |
| | Resin part | DERCOLYTE ™ A115 | 45.5 wt % |
| | Plasticizing resin part | WINGTACK ® 10 | 3.0 wt % |
| | Additives | IRGANOX ® 1010 | 0.5 wt % |
| | Microballoons | EXPANCEL ® | 1.0 wt % |
| | Thickness* | | 50 μm |
| Carrier B | Elastomer part | KRATON ® D1102 AS polymer | 99.5 wt % |
| | Resin part | -/- | |
| | Plasticizing resin part | -/- | |
| | Additives | IRGANOX ® 1010 | 0.5 wt % |
| | Thickness | | 50 μm |
| Adhesive A2 | Elastomer part | KRATON ® D1102 AS polymer | 42.0 wt % |
| | | KRATON ® D1118 ES polymer | 8.0 wt % |
| | Resin part | PICCOLYTE ® A115 | 45.5 wt % |
| | Plasticizing resin part | WINGTACK ® 10 | 3.0 wt % |
| | Additives | IRGANOX ® 1010 | 0.5 wt % |
| | Microballoons | EXPANCEL ® 920 DU20 | 1.0 wt % |
| | Thickness* | | 50 μm |

Example 8.2 (Comparative)

| | | Type | Fraction |
|---|---|---|---|
| Adhesive A1 | Elastomer part | KRATON ® D1102 AS polymer | 42.0 wt% |
| | | KRATON® D1118 ES | 8.0 wt% |
| | Resin part | PICCOLYTE ® A115 | 45.5 wt % |
| | Plasticizing resin part | WINGTACK ® 10 | 3.0 wt % |
| | Additives | IRGANOX ® 1010 | 0.5 wt % |
| | Microballoons | -EXPANCEL ® 920 DU20 | 1.0 wt % |
| | Thickness* | | 50 μm |
| Carrier B | Elastomer part | KRATON ® D1102 AS polymer | 99.5 wt % |
| | Resin part | -/- | |
| | Plasticizing resin part | -/- | |
| | Additives | IRGANOX ® 1010 | 0.5 wt % |
| | Thickness | | 80 μm |
| Adhesive A2 | Elastomer part | KRATON ® D1102 AS polymer | 42.0 wt % |
| | | KRATON ® D1118 ES polymer | 8.0 wt % |
| | Resin part | PICCOLYTE ® A115 | 45.5 wt % |
| | Plasticizing resin part | WINGTACK ® 10 | 3.0 wt % |
| | Additives | IRGANOX ® 1010 | 0.5 wt % |

| | | Type | Fraction |
|---|---|---|---|
| | Microballoons | EXPANCEL ® 920 DU20 | 1.0 wt % |
| | Thickness* | | 50 μm |

| | Diblock fraction Carrier layer | Peel adhesion | Shock resistance | Resistance to tears |
|---|---|---|---|---|
| Example 1.1 | 17% | 10.3 N/cm | 633 mJ | 0/3 @ 800 mm/min |
| Example 1.2 | 17% | 10.8 N/cm | 603 mJ | 0/3 @ 800 mm/min |
| Example 1.3 | 17% | 9.8 N/cm | 662 mJ | 0/3 @ 800 mm/min |
| Example 2.1 | 16% | 9.5 N/cm | 589 mJ | 0/3 @ 500 mm/min 3/3 @ 700 mm/min |
| Example 2.2 | 16% | 9.5 N/cm | 618 mJ | 2/3 @ 500 mm/min 3/3 @ 700 mm/min |
| Example 2.3 | 16% | 9.8 N/cm | 662 mJ | 0/3 @ 800 mm/min |
| Example 2.4 | 16% | 10.8 N/cm | 662 mJ | 0/3 @ 800 mm/min |
| Example 3.1 | —/— | 7.6 N/cm | 559 mJ | 0/3 @ 300 mm/min 3/3 @ 500 mm/min |
| Example 4.1 | 26.8% | 13.6 N/cm | 383 mJ | 0/3 @ 800 mm/min |
| Example 4.2 | 26.8% | 10.9 N/cm | 662 mJ | 3/3 @ 100 mm/min |
| Example 5.1 | 26.8% | 10.3 N/cm | 647 mJ | 3/3 @ 300 mm/min |
| Example 6.1 | 17% | 10.6 N/cm | 740 mJ | 0/3 @ 800 mm/min |
| Example 6.2 | 17% | 11.4 N/cm | 840 mJ | 0/3 @ 800 mm/min |
| Example 7.1 | <1% | 10.3 N/cm | 750 mJ | 3/3 @ 500 mm/min |
| Example 7.2 | <1% | 10.6 N/cm | 750 mJ | 3/3 @ 500 mm/min |
| Example 7.3 | 20% | 11.4 N/cm | 589 mJ | 3/3 @ 500 mm/min |
| Example 7.4 | 20% | 14.1 N/cm | 574 mJ | 3/3 @ 500 mm/min |
| Example 8.1 | 17% | 4.6 N/cm | 353 mJ | 0/3 @ 800 mm/min |
| Example 8.2 | 17% | 2.3 N/cm | 338 mJ | 0/3 @ 800 mm/min |

Examples 1.1, 1.2 and 1.3 show that the inventive architecture of self-adhesive strips meets the specified performance requirements. The advantageous resistance to shock exposure is attributable to the foamed layers of adhesive. The example products can be detached from a test bonded assembly through inventive design of the carrier layer under very challenging conditions (detachment angle of approximately 180° around two edges even at a high detachment speed of 800 mm/min).

Examples 2.1, 2.2, 2.3 and 2.4 show the influence of the thickness of the carrier layer. Carrier thicknesses of 30 μm or 50 μm do not afford the improved resistance to tears during detachment. At 700 mm/min, all three test strips already suffer tearing. If carrier thicknesses of 80 μm or 100 μm are selected, detachment is possible even at 800 mm/min.

A polyurethane film 80 μm thick (Example 3.1) as carrier layer is suitable for numerous applications. However, it does allow detachment to take place under the very challenging detachment speeds imposed here.

Examples 4.1 and 4.2 show that a fully unfoamed 150 μm self-adhesive strip (Example 4.1) can be parted from the test bond very well even under the difficult detachment conditions employed here. Without the foaming, however, the shock resistance is not at the required level. A completely foamed self-adhesive strip, in contrast, does have outstanding shock resistance, but does not afford sufficient resistance to tears in the detachment test.

From Example 5.1 it is apparent that a composition for the carrier layer that is not inventive with regard to the diblock fraction in the elastomer part (b1) does not meet the requirements imposed for detachability under the very challenging conditions set here.

Examples 6.1 and 6.2 show further inventive product architectures with the corresponding advantageous performance properties of peel adhesion, shock resistance and detachment behaviour. The shock resistance here is very high, in spite of the fact that the foamed layers of adhesive have thicknesses of only 25 μm and 35 μm respectively.

In Examples 7.1, 7.2, 7.3 and 7.4, the results are summarized for an investigation with a different elastomer basis for the carrier layer. Here, formulation took place with polystyrene-polyisoprene block copolymers rather than with polystyrene-polybutadiene block copolymers. The Vector 4111N used in Example 7.1 and 7.2 has a polystyrene fraction of 18%. This proves to be too low for sufficient detachability, even at a carrier layer thickness of 80 μm (Example 7.2). Examples 7.3 and 7.4 used KRATON® D1165 PT, a polystyrene-polyisoprene block copolymer, with a polystyrene fraction of 30%. A carrier layer with a thickness of 50 μm again proves to be too thin to meet the required resistance to tears for the detachment process. If an inventive carrier layer thickness of 80 μm is selected, then it is found that a diblock fraction in the elastomer part of 20% is no longer sufficient to achieve the required detachability under the very challenging conditions. Peel adhesion and shock resistance are each at the required level for these inventive specimens.

Finally, Examples 8.1 and 8.2 reveal that with a carrier layer which, while being formed of an elastomer, contains no resins present in the outer pressure-sensitive adhesive layers, the resulting multilayer assembly lacks sufficient stability. Detachment properties found are good, admittedly. Within a short time, however, the self-adhesive strip suffers significant loss of peel adhesion, a factor attributable at least partly to migration of tackifying resin and plasticizing resin from the pressure-sensitive adhesive layers into the carrier layer.

TEST METHODS

Unless otherwise indicated, all measurements were carried out at 23° C. and 50% relative humidity.

Test I—Glass Transition Temperature (DSC)

Figure 3:
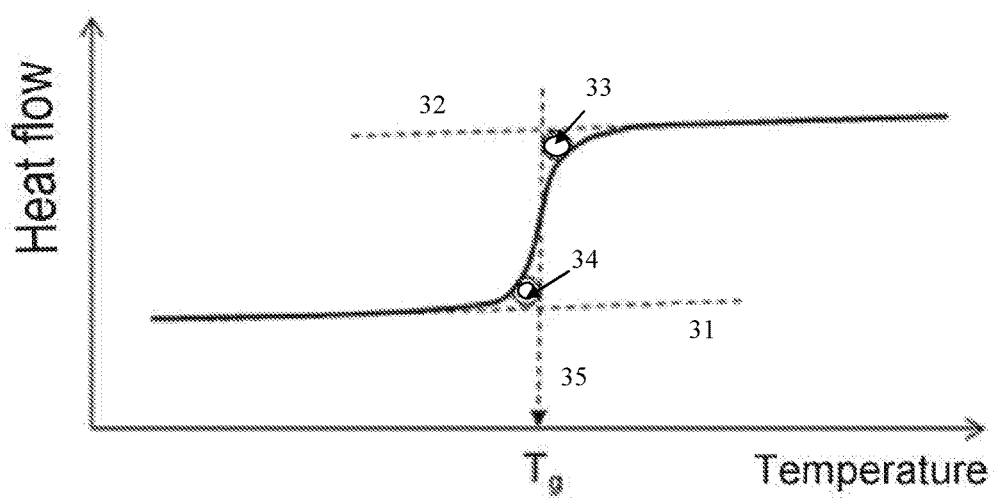
FIG. 3 shows a thermogram and steps to determine glass transition temperature.

The glass transition temperature of polymer blocks in block copolymers is determined by means of dynamic scanning calorimetry (DSC). For this purpose, about 5 mg of the untreated block copolymer samples are weighed into an aluminium crucible (volume 25 μL) and closed with a perforated lid. For the measurement, a DSC 204 F1 from Netzsch is used, and is operated under nitrogen for inertization. The sample is cooled initially to −150° C., heated to +150° C. at a rate of 10 K/min, and cooled again to −150° C. The subsequent, second heating curve is run again at 10 K/min and the change in the heat capacity is recorded. Glass transitions are identified as steps in the thermogram. The glass transition temperature is evaluated as follows (see in this regard FIG. 3): A tangent is applied in each case to the baseline of the thermogram before 31 and after 32 of the steps. In the region of the step, a balancing line 33 is placed parallel to the ordinate in such a way that it intersects the two tangents, specifically so as to form two areas 34 and 35 of equal content (between each tangent, the balancing line and the measuring plot). The point of intersection of the balancing line thus positioned with the measuring block gives the glass transition temperature.

Test II—Molar Mass (GPC)

(i) Peak Molar Mass of Individual Block Copolymer Modes

GPC is an appropriate technical measuring method for determining the molar mass of individual polymer modes in mixtures of different polymers. For the block copolymers which can be used for the purposes of this invention, prepared by living anionic polymerization, the molar mass distributions are typically narrow enough that polymer modes which can be assigned to triblock copolymers, diblock copolymers or multiblock copolymers occur with sufficient resolution from one another in the elugram. The peak molar mass for the individual polymer modes can then be read off from the elugram.

Peak molar masses Mp are determined by means of gel permeation chromatography (GPC). The eluent used is THF. Measurement takes place at 23° C. The pre-column used is PSS-SDV, 5μ, $10^3$ Å, ID 8.0 mm×50 mm. Separation is carried out using the columns PSS-SDV, 5μ, $10^3$ Å and also $10^4$ Å and $10^6$ Å each with ID 8.0 mm×300 mm. The sample concentration is 4 g/l, the flow rate 1.0 ml per minute. Measurement takes place against PS standards (μ=μm; 1 Å=$10^{-10}$ m).

(ii) Weight-Average Molar Mass, Particularly of Tackifying Resins

The weight-average molecular weight $M_w$ (M.W.) is determined by means of gel permeation chromatography (GPC). The eluent used is THF. Measurement takes place at 23° C. The pre-column used is PSS-SDV, 5μ, $10^3$ Å, ID 8.0 mm×50 mm. Separation is carried out using the columns PSS-SDV, 5μ, $10^3$ Å and also $10^4$ Å and $10^6$ Å each with ID 8.0 mm×300 mm. The sample concentration is 4 g/l, the flow rate 1.0 ml per minute. Measurement takes place against PS standards (μ=μm; 1 Å=$10^{-10}$ m).

Test III—DACP 5.0 g of test substance (the tackifying resin specimen under examination) are weighed out into a dry test tube, and 5.0 g of xylene (isomer mixture CAS [1330-20-7], ≥98.5%, Sigma-Aldrich #320579 or comparable) are added. The test substance is dissolved at 130° C. and then the solution is cooled to 80° C. Any xylene that has escaped is made up for with further xylene, so that 5.0 g of xylene are again present. Then 5.0 g of diacetone alcohol (4-hydroxy-4-methyl-2-pentanone, CAS [123-42-2], 99%, Aldrich #H41544 or comparable) are added. The test tube is shake until the test substance has dissolved completely. For this purpose the solution is heated to 100° C. The test tube containing the resin solution is then introduced into a Novamatics Chemotronic Cool cloud point measuring instrument and heated therein to 110° C. Cooling takes place at a cooling rate of 1.0 K/min. The cloud point is detected optically. For this purpose, the temperature is registered at which the turbidity of the solution is 70%. The result is reported in ° C. The lower the DACP, the higher the polarity of the test substance.

Test IV—MMAP 5.0 g of test substance (the tackifying resin specimen under examination) are weighed out into a dry test tube, and 10 ml of dry aniline (CAS [62-53-3], ≥99.5%, Sigma-Aldrich #51788 or comparable) and 5 ml of dry methylcyclohexane (CAS [108-87-2], ≥99%, Sigma-Aldrich #300306 or comparable) are added. The test tube is shaken until the test substance has dissolved completely. For this purpose, the solution is heated to 100° C. The test tube containing the resin solution is then introduced into a Novamatics Chemotronic Cool cloud point measuring instrument and heated therein to 110° C. Cooling takes place at a cooling rate of 1.0 K/min. The cloud point is detected optically. For this purpose, the temperature is registered at which the turbidity of the solution is 70%. The result is reported in ° C. The lower the MMAP, the higher the aromaticity of the test substance.

Test V—Tackifying Resin Softening Temperature

The tackifying resin softening temperature is carried out according to the relevant methodology, which is known as ring & ball and is standardized according to ASTM E28.

Test VI—Melt Viscosity

For determining the melt viscosity of the plasticizing resins, a shear stress sweep is carried out in rotation in a shear stress-controlled DSR 200 N Rheometer from Rheometrics Scientific. A cone/plate measuring system with a diameter of 25 mm (cone angle 0.1002 rad) is employed; the measuring head is air-mounted and is suitable for standard force measurements. The gap is 0.053 mm and the measuring temperature is 25° C. The frequency is varied from 0.002 Hz to 200 Hz and the melt viscosity is recorded at 1 Hz.

A mechanical and technical adhesive data were ascertained as follows:

Test VII—Penetration Toughness; z-Plane (DuPont Test)

A square sample having frame format (external dimensions 33 mm×33 mm; border width 2.0 mm; internal dimensions (window cutout) 29 mm×29 mm) was cut from the adhesive tape under investigation. This sample was adhered to a polycarbonate (PC) frame (external dimensions 45 mm×45 mm; border width 10 mm; internal dimensions (window cutout) 25 mm×25 mm; thickness 3 mm). Adhered on the other side of the double-sided adhesive tape is a PC window of 35 mm×35 mm. The bonding of PC frame, adhesive tape frame and PC window was carried out such that the geometric centres and the diagonals lay above one another in each case (corner to corner). The bond area was 248 mm². The bond was pressed at 248 N for 5 seconds and stored for 24 hours with conditioning at 23° C./50% relative humidity.

Immediately after storage, the bonded assembly of PC frame, adhesive tape and PC window was clamped, by the protruding edges of the PC frame, into a sample mount in such a way that the assembly was aligned horizontally, the PC frame here lies flat on the protruding edges on the sample mount, and so the PC window was in free suspension (held by the adhesive tape specimen) beneath the PC frame. The sample mount was subsequently inserted centrically into the holder provided on the DuPont Impact Tester. The impact head, which weighed 150 g, was inserted such that the circular striking geometry with the diameter of 24 mm lay centrically and flush against the area of the PC window that was freely accessible from above.

A weight with a mass of 150 g, guided on two guide rods, was dropped vertically from a height of 5 cm onto the thus-disposed assembly made of sample mount, sample and impact head (measuring conditions 23° C., 50% relative humidity). The height of the drop weight was raised in steps of 5 cm until the impact energy introduced destroys the sample, as a result of the penetration load, and the PC window underwent detachment from the PC frame.

In order to be able to compare experiments with different samples, the energy was calculated as follows:

$$E \text{ [J]} = \text{height [m]} * \text{mass of weight [kg]} * 9.81 \text{ kg/m} * s^2$$

For each product, five samples were tested, and the mean energy was recorded as an index of the penetration toughness.

Test VIII—Peel Adhesion

The peel adhesion was determined (according to AFERA 5001) as follows: the defined adhesion base is a polished steel plate having a thickness of 2 mm. The bondable sheet-like element under test (equipped on the reverse with a 36 µm etched PET support film) is trimmed to a width of 20 mm and a length of approximately 25 cm, provided with a handling section, and pressed immediately thereafter onto the respective adhesion base selected, this pressing operation taking place five times using a steel roller of 4 kg at an advance velocity of 10 m/min. Immediately after that, the bondable sheet-like element is pulled from the adhesion base at an angle of 180° using a tensile tester (from Zwick) with a velocity v=300 mm/min, and the force required to achieve this at room temperature is recorded. The recorded value (in N/cm) is obtained as the average value from three individual measurements.

Test IX—Resistance to Tears (Detachment Test)

In order to create particularly challenging detachment conditions reproducibly for the testing of the test strips, a mechanical method was selected in which an adhesive strip under test is extracted from a bonded assembly by extensive stretching at a detachment angle of approximately 180°. The higher the detachment velocity at this detachment geometry, which is already selected so as to be extremely challenging, the greater the risk of tearing in the course of extensive stretching in the detachment operation. The test is carried out on a tensile tester (from Zwick).

For each specimen, three test strips are die-cut. The geometry of the individual strips comprises a length of 5 cm and a width of 12 mm. One end of the test strips has a taper in the form of an equilateral triangle (height 1 cm).

These test strips are used to produce test assemblies, for which two test plates (polyethylene terephthalate of type Centrolyte PET-P, from ThyssenKrupp Plastics GmbH; 3 mm thick; sawn, unsanded edges), which beforehand were cleaned with isopropanol and then dried for 20 minutes, were bonded to one another. For this purpose, one test strip was first adhered to one of the PET plates in such a way that the non-tapering end of the strip protrudes 1 cm beyond the edge of the test plate. The second liner is removed and the second PET plate is bonded. For this purpose, a 4 kg roller is rolled back and forth over the assembly five times (velocity: 1 m/min). The second plate is positioned such that part of this plate protrudes beyond the edge of the first plate, thus allowing the protruding part of the second plate to be clamped into the lower fixed part of the tensile testing machine. During production of the assembly, care is taken to ensure that the end of the strip protruding at the edge of the first plate is not bonded to the protruding part of the second plate. The assembly is clamped into the lower fixed part of the tensile testing machine. The protruding part of the adhesive tape is guided around the narrow side of the first plate and clamped into the upper, moveable part of the tensile testing machine. The adhesive tape is stripped from the assembly at an angle of approximately 180° and at a velocity x.

This measurement is carried out on three individual samples per specimen per test velocity. The number of test strips not torn for a pre-set removal velocity is recorded. "0/3" means that out of three test strips, none of them tore at the specified removal velocity. "3/3" means that all three test strips tore at the specified removal velocity.

Figure 4:
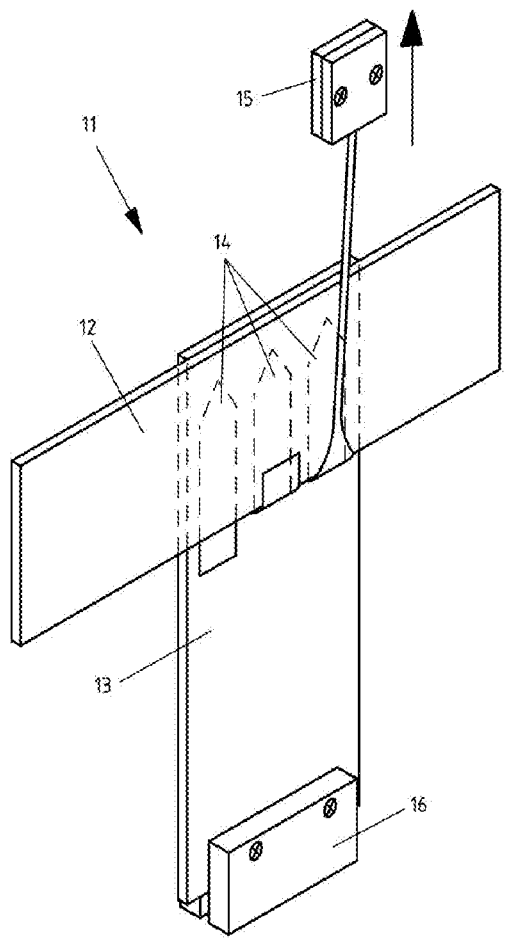
FIG. 4 shows the basic construction of Test IX—Resistance to tears (detachment test).

FIG. 4 shows the basic construction of the test. In that figure the reference numerals have the following meanings:
11 Test assembly
12 Test plate
13 Test plate
14 Test strip
15 Clamp (displaceable)
16 Clamp (fixed)

The invention claimed is:

1. An adhesive strip redetachable without residue or destruction by extensive stretching substantially in a bond plane, comprising
an adhesive layer A, which is foamed with microballoons, and which comprises a pressure-sensitive adhesive A,
a carrier layer B consisting of a carrier B,
wherein pressure-sensitive adhesive A
comprises an elastomer part (a1) based on at least one kind of a polyvinylaromatic-polydiene block copolymer, where elastomer part (a1) comprises at least 90 wt % of the at least one kind of a polyvinylaromatic-polydiene block copolymer having a polyvinylaromatic content of at least 12 wt % and at most 35 wt %, and a fraction of elastomer part (a1), based on the overall pressure-sensitive adhesive A, is at least 40 wt % and at most 55 wt %, and
comprises a tackifying resin part (a2) with at least one kind of a tackifying resin, where tackifying resin part (a2) comprises at least 90 wt % of hydrocarbon resins which are substantially compatible with polydiene blocks in the at least one kind of a polyvinylaromatic-polydiene block copolymer and substantially incompatible with polyvinylaromatic blocks in the at least one kind of a polyvinylaromatic-polydiene block copolymer, and a fraction of tackifying resin part (a2), based on the overall pressure-sensitive adhesive A is at least 40 wt % and at most 60 wt %, and
optionally comprises a plasticizing resin part (a3), where a fraction of plasticizing resin part (a3), based on the overall pressure-sensitive adhesive A, is 0 wt % to at most 5 wt %, and
optionally comprises further additives (a4),
where a fraction of microballoons, based on the overall pressure-sensitive adhesive A, is at least 0.5 wt % and at most 2.5 wt %,
where a thickness of adhesive layer A is at least 20 μm and at most 75 μm, and wherein carrier B
comprises an elastomer part (b1) based on at least one kind of a polyvinylaromatic-polydiene block copolymer, where elastomer part (b1) comprises at least 90 wt % of the at least one kind of the polyvinylaromatic-polydiene block copolymer having a polyvinylaromatic content of at least 20 wt % and at most 45 wt %,
a fraction, within elastomer part (b1), of at least one triblock copolymer (linear or radial) or multiblock copolymer (linear or radial) is at least 80 wt %,
a peak molar mass by GPC of the at least one triblock copolymer (linear or radial) or multiblock copolymer (linear or radial) is at least 85 000 g/mol, a fraction of diblock copolymer(s) is below 20 wt %, and
a fraction of elastomer part (b1), based on an overall formulation of carrier B, is at least 40 wt % and at most 60 wt %, and
comprises a tackifying resin part (b2) with at least one kind of a tackifying resin, where tackifying resin part (b2) comprises at least 90 wt % of hydrocarbon resins which are substantially compatible with polydiene blocks in the at least one kind of a polyvinylaromatic-polydiene block copolymer, and substantially incompatible with polyvinylaromatic blocks in the at least one kind of a polyvinylaromatic-polydiene block copolymer and a fraction of tackifying resin part (b2), based on the overall formulation of carrier B, is at least 40 wt % and at most 60 wt %, and
optionally comprises a plasticizing resin part (b3),
where a fraction of plasticizing resin fraction (b3), based on the overall formulation of carrier B, is 0 wt % to at most 5 wt %, and optionally further additives (b4),
where a thickness of carrier layer B is at least 70 μm and at most 150 μm,
where a density of carrier B is at least 950 g/cm$^3$.

2. The adhesive strip according to claim 1, consisting of one or more layers of adhesive layer A, consisting of pressure-sensitive adhesive A, and one or more layers of carrier layer B.

3. The adhesive strip according to claim 1, wherein the polyvinylaromatic content of the at least one kind of a polyvinylaromatic-polydiene block copolymer in elastomer part (a1) is at least 20 wt % and at most 32 wt %, and the fraction of the elastomer part (a1), based on the overall pressure-sensitive adhesive A, is at least 45 wt % and at most 55 wt %.

4. The adhesive strip according to claim 1, wherein tackifying resin part (a2) comprises at least 95 wt % of the hydrocarbon resins which are substantially compatible with the polydiene blocks and substantially incompatible with the polyvinylaromatic blocks.

5. The adhesive strip according to claim 1, wherein the fraction of microballoons, based on the overall pressure-sensitive adhesive A, is at least 1.0 wt % and at most 2.0 wt %.

6. The adhesive strip according to claim 1, wherein the thickness of adhesive layer A is at least 25 μm and at most 65 μm.

7. The adhesive strip according to claim 1, wherein
the polyvinylaromatic content of the at least one kind of a polyvinylaromatic-polydiene block copolymer in elastomer part (b1) is at least 25 wt % and at most 35 wt %,
the fraction, within the elastomer part (b1), of the at least one triblock copolymer (linear or radial) or multiblock copolymer (linear or radial) is at least 90 wt %, the fraction of diblock copolymer(s) is at most 10 wt %, and the fraction of elastomer part (b1), based on the overall formulation of carrier B, is at least 45 wt % and at most 55 wt %.

8. The adhesive strip according to claim 1, wherein elastomer part (b1) comprises at least 90 wt % of polyvinylaromatic-butadiene block copolymers and/or polyvinylaromatic-polyisoprene block copolymers.

9. The adhesive strip according to claim 1, wherein tackifying resin part (b2) comprises at least 95 wt % of the hydrocarbon resins which are substantially compatible with the polydiene blocks and substantially incompatible with the polyvinylaromatic blocks.

10. The adhesive strip according to claim 1, wherein the thickness of carrier layer B is at least 80 μm and at most 120 μm and/or carrier layer B is substantially unfoamed.

11. The adhesive strip according to claim 1, wherein tackifying resin part (a2) and tackifying resin part (b2) are chemically identical.

12. The adhesive strip according to claim 1, wherein the at least one kind of a polyvinylaromatic-polydiene block copolymer of pressure-sensitive adhesive A are based on block copolymers comprising polymer blocks (i) predominantly formed of vinylaromatics (A blocks), and polymer blocks (ii) predominantly formed by polymerization of 1,3-dienes (B blocks).

13. The adhesive strip according to claim 1, wherein vinylaromatic block copolymer in elastomer part (a1) and/or elastomer part (b1) comprise(s) at least one synthetic rubber in the form of a block copolymer having a structure A-B, A-B-A, (A-B)$_n$, (A-B)$_n$X or (A-B-A)$_n$X, in which blocks A independently of one another are a polymer formed by polymerization of at least one vinylaromatic;

blocks B independently of one another are a polymer formed by polymerization of conjugated dienes having 4 to 18 carbon atoms and/or isobutylene, or are a partly or fully hydrogenated derivative of such a polymer;

X is the radical of a coupling reagent or initiator; and n is an integer ≥2.

14. The adhesive strip according to claim 13, wherein vinylaromatics for synthesizing blocks A comprise styrene, α-methylstyrene and/or other styrene derivatives.

15. The adhesive strip according to claim 13, wherein monomers in blocks B are selected from the group consisting of butadiene, isoprene, ethylbutadiene, phenylbutadiene, piperylene, pentadiene, hexadiene, ethylhexadiene and dimethylbutadiene and any mixture of these monomers.

16. The adhesive strip according to claim 1, wherein pressure-sensitive adhesive A comprises at least 40 wt %, and not more than 55 wt % of the at least one kind of a polyvinylaromatic-polydiene block copolymer.

17. The adhesive strip according to claim 1, wherein tackifying resin (a2) has a diacetone alcohol cloud point (DACP) of greater than +5° C., a mixed methylcyclohexane aniline point (MMAP) of at least +50° C., and/or a softening temperature (ring & ball) of greater than or equal to 70° C.

18. The adhesive strip according to claim 1, wherein at least 75 wt % of the hydrocarbon resins of the at least one kind of a tackifying resin of the tackifying resin part (a2) comprises terpene resins.

19. The adhesive strip according to claim 1, wherein pressure-sensitive adhesive A consists of the following composition:

40 to 55 wt % of the at least one kind of a polyvinylaromatic-polydiene block copolymer;

40 to 59.3 wt % of the tackifying resins and optionally plasticizing resins;

0.5 to 2.5 wt % of the microballoons; and 0.2 to 10 wt % of the additives.

20. The adhesive strip according to claim 1, wherein the absolute density of adhesive layer A is 450 to 950 kg/m$^3$, and/or the relative density is 0.22 to 0.99.

21. The adhesive strip according to claim 1, wherein carrier B consists of the following composition:

40 to 59.8 wt % of the at least one kind of a polyvinylaromatic-polydiene block copolymer;

40 to 59.8 wt % of the tackifying resins and optionally plasticizing resins; and 0.2 to 10 wt % of the additives.

22. The adhesive strip according to claim 1, having an overall thickness, without temporary release liners or release films, of at most 250 μm.

23. The adhesive strip according to claim 1, wherein carrier layer B has a thickness of between 80 to 120 μm.

24. A method of bonding components of batteries and electronic devices comprising a step of applying an adhesive strip of claim 1.

* * * * *